(12) United States Patent
Kim et al.

(10) Patent No.: US 8,196,424 B2
(45) Date of Patent: Jun. 12, 2012

(54) APPARATUS FOR SUPERCOOLING AND METHOD OF MAKING SLUSH THROUGH SUPERCOOLING

(75) Inventors: Su-Cheong Kim, Busan (KR); Jong-Min Shin, Busan (KR); Su-Won Lee, Changwon (KR); Cheol-Hwan Kim, Gimhae (KR); Yong-Chol Kwon, Changwon (KR); Ku-Young Son, Busan (KR)

(73) Assignee: LG Electronics Inc., Seoul (KR)

( * ) Notice: Subject to any disclaimer, the term of this patent is extended or adjusted under 35 U.S.C. 154(b) by 759 days.

(21) Appl. No.: 12/279,579

(22) PCT Filed: Sep. 27, 2006

(86) PCT No.: PCT/KR2006/003849
§ 371 (c)(1),
(2), (4) Date: Feb. 10, 2009

(87) PCT Pub. No.: WO2007/094539
PCT Pub. Date: Aug. 23, 2007

(65) Prior Publication Data
US 2010/0218510 A1    Sep. 2, 2010

(30) Foreign Application Priority Data

| Feb. 15, 2006 | (KR) | 10-2006-0014692 |
| Jul. 1, 2006 | (KR) | 10-2006-0061686 |
| Jul. 1, 2006 | (KR) | 10-2006-0061691 |
| Jul. 1, 2006 | (KR) | 10-2006-0061694 |

(51) Int. Cl.
*F25D 3/00* (2006.01)

(52) U.S. Cl. .......................................... 62/389; 62/441
(58) Field of Classification Search ................ 62/389, 62/449, 340, 441, 348, 407, 314, 66; 222/146.1, 222/146.6
See application file for complete search history.

(56) References Cited

U.S. PATENT DOCUMENTS

| 5,442,933 A | 8/1995 | Unger |
| 5,564,286 A * | 10/1996 | Suse ............................... 62/153 |
| 5,634,344 A * | 6/1997 | Yamauchi ......................... 62/75 |
| 6,182,453 B1 * | 2/2001 | Forsberg ......................... 62/125 |
| 6,226,994 B1 * | 5/2001 | Yamada et al. ................... 62/3.7 |
| 6,672,097 B1 | 1/2004 | Ashley |
| 6,951,113 B1 * | 10/2005 | Adamski ........................ 62/3.62 |
| 7,114,637 B2 * | 10/2006 | Davis .......................... 222/146.6 |
| 7,216,491 B2 * | 5/2007 | Cole et al. ......................... 62/74 |

(Continued)

FOREIGN PATENT DOCUMENTS

GB    2 282 216 A    3/1995

(Continued)

OTHER PUBLICATIONS

English language translation of JP-2001-86967 (Apr. 3, 2001).

*Primary Examiner* — Mohammad Ali
(74) *Attorney, Agent, or Firm* — Birch, Stewart, Kolasch & Birch, LLP

(57) ABSTRACT

The present invention discloses an apparatus for supercooling and a method of maMng slush thrαgh supercooling which generate a supercooled liquid by supplying cool air and energy, control the state of the supercooled liquid, store and supply the supercooled liquid, generate slush by applying an external force to the supercooled liquid, maintain the state of the slush, and supply the slush.

39 Claims, 16 Drawing Sheets

U.S. PATENT DOCUMENTS

| | | | | |
|---|---|---|---|---|
| 2001/0003347 A1* | 6/2001 | Shimoda et al. | | 236/13 |
| 2005/0236432 A1* | 10/2005 | Davis | | 222/146.6 |
| 2006/0016207 A1* | 1/2006 | Tremblay et al. | | 62/342 |
| 2006/0096310 A1* | 5/2006 | Lee | | 62/348 |

FOREIGN PATENT DOCUMENTS

| | | |
|---|---|---|
| JP | 59-151834 A | 8/1984 |
| JP | 03-291474 A | 12/1991 |
| JP | 8-247505 A | 9/1996 |
| JP | 2001-009728 A | 1/2001 |
| JP | 2001-86967 A | 4/2001 |
| JP | 2002-22333 A | 1/2002 |
| JP | 2002-350017 A | 12/2002 |
| JP | 2003-088347 A | 3/2003 |
| JP | 2005-257207 A | 9/2005 |
| KR | 1998-0076685 B1 | 11/1998 |
| KR | 1998-078685 A | 11/1998 |
| KR | 2001-0107286 A | 12/2001 |
| KR | 2003-0050929 A | 6/2003 |
| KR | 10-2005-0087538 A | 8/2005 |
| KR | 20-0393464 Y1 | 8/2005 |
| KR | 10-2005-0102244 A | 10/2005 |
| KR | 10-2005-0106553 A | 11/2005 |
| KR | 10-2006-0013721 A | 2/2006 |
| WO | WO-98/41115 A1 | 9/1998 |
| WO | WO-2004/102088 A1 | 11/2004 |

* cited by examiner

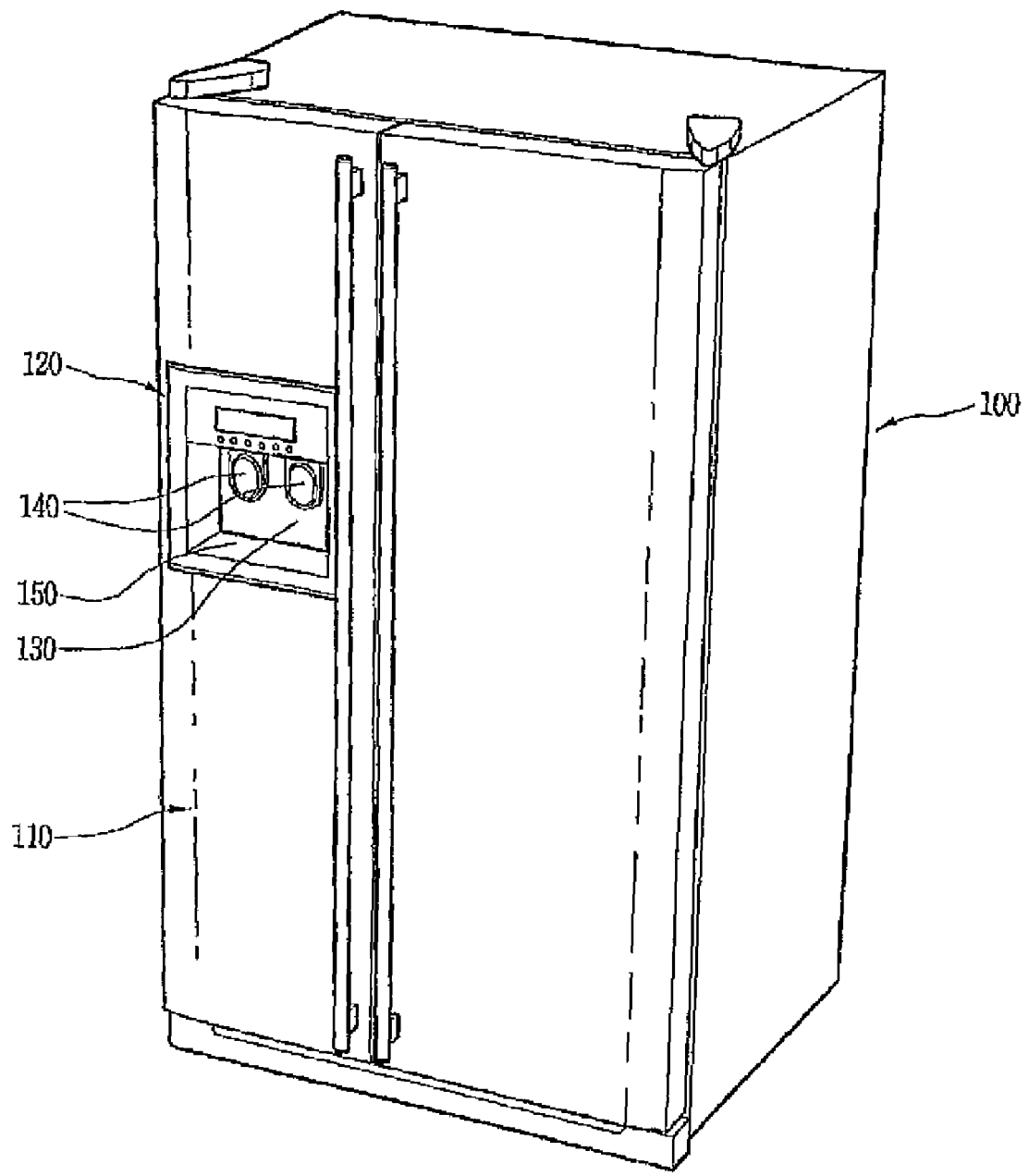
[Fig. 1]

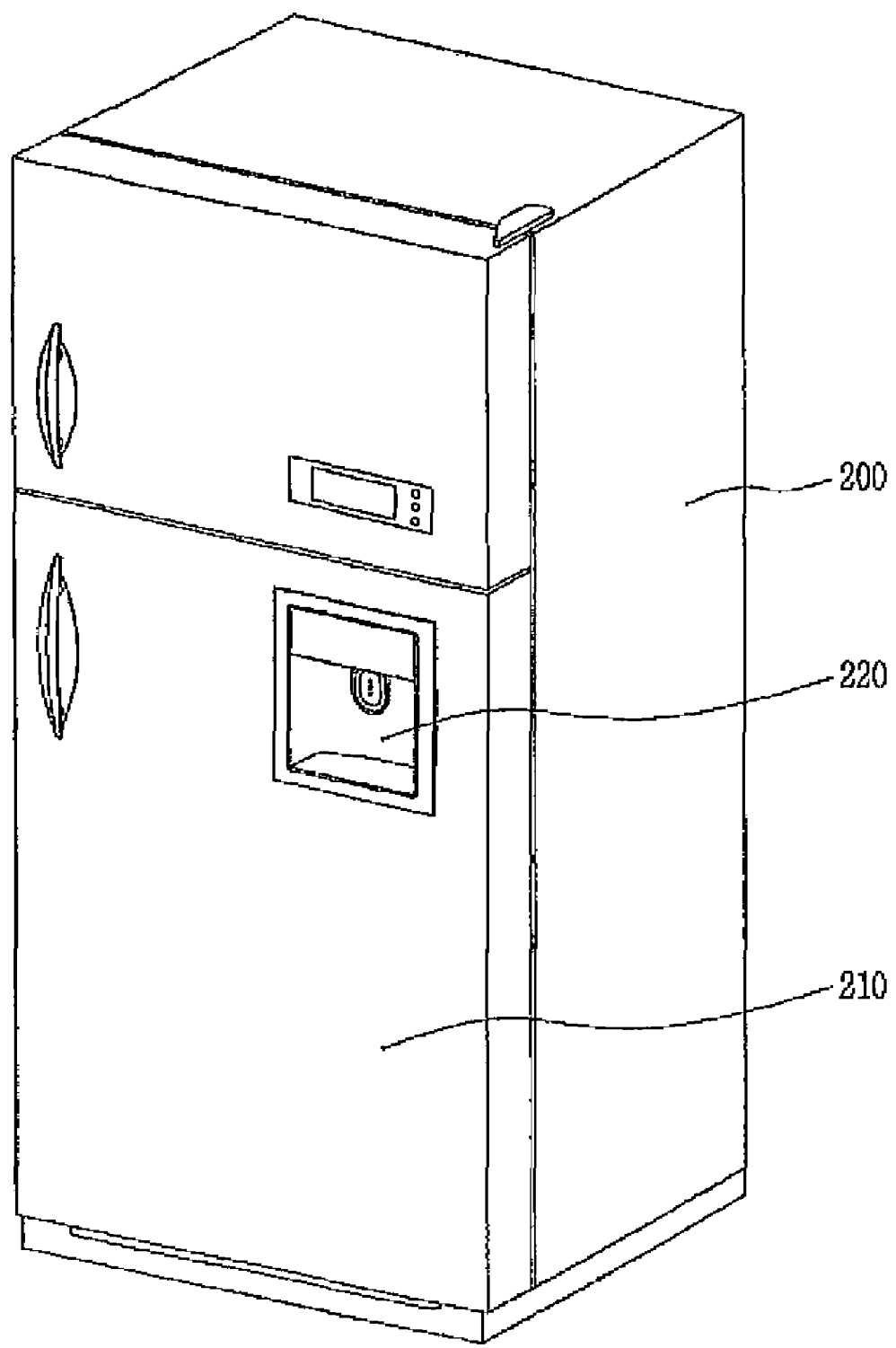
[Fig. 2]

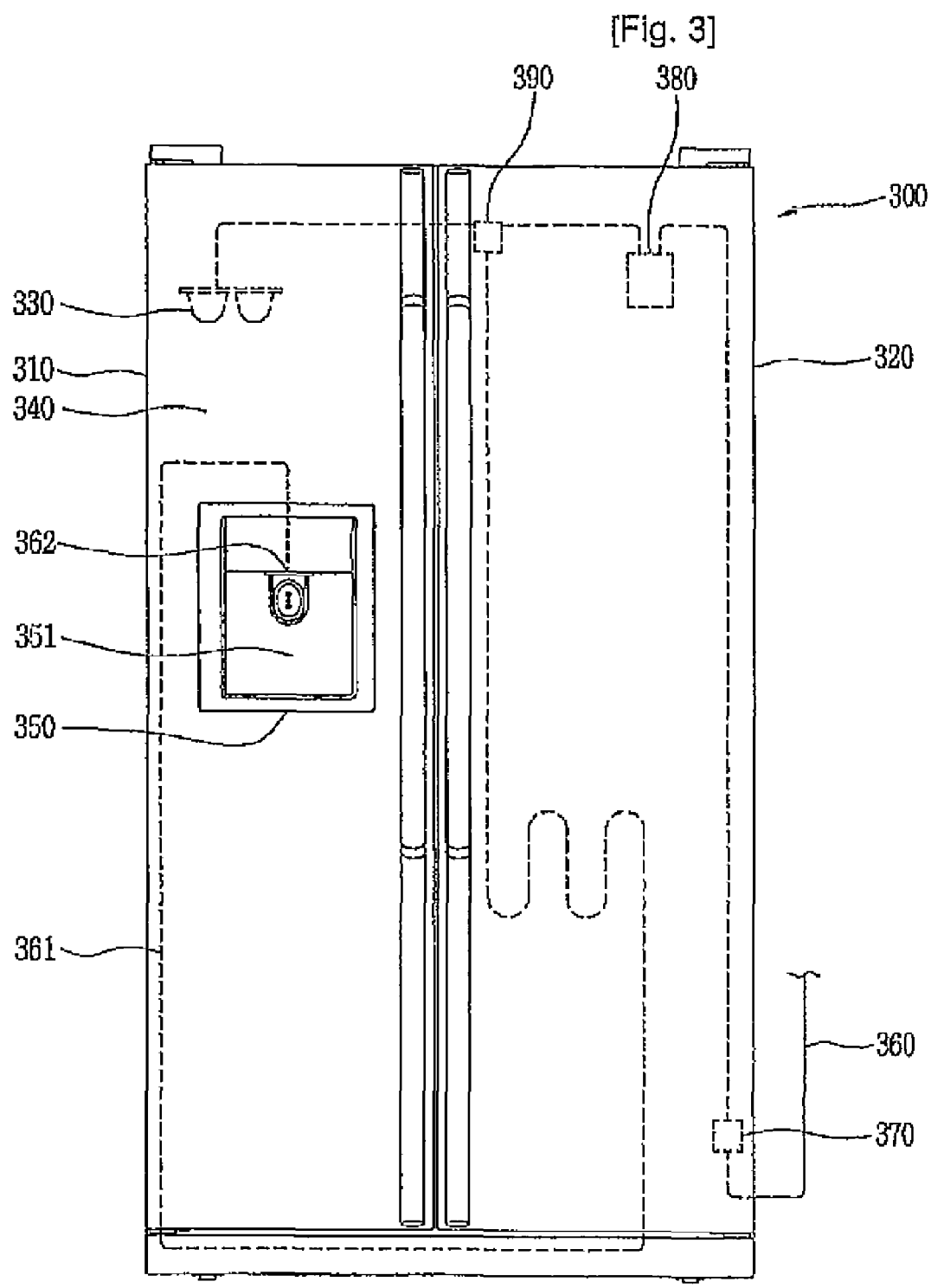

[Fig. 4]
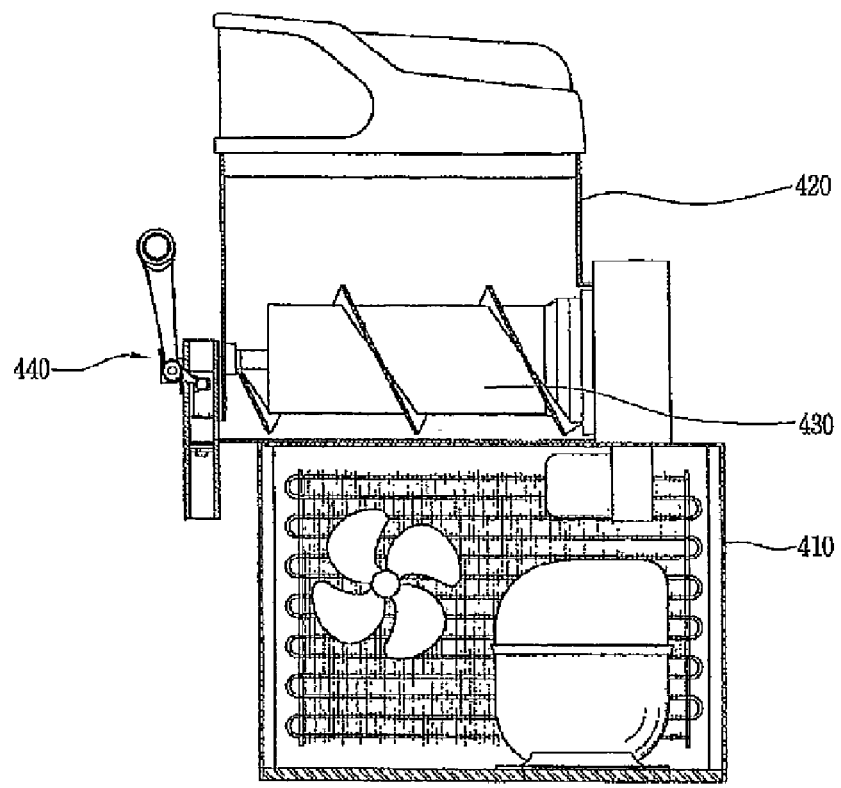
[Fig. 5]
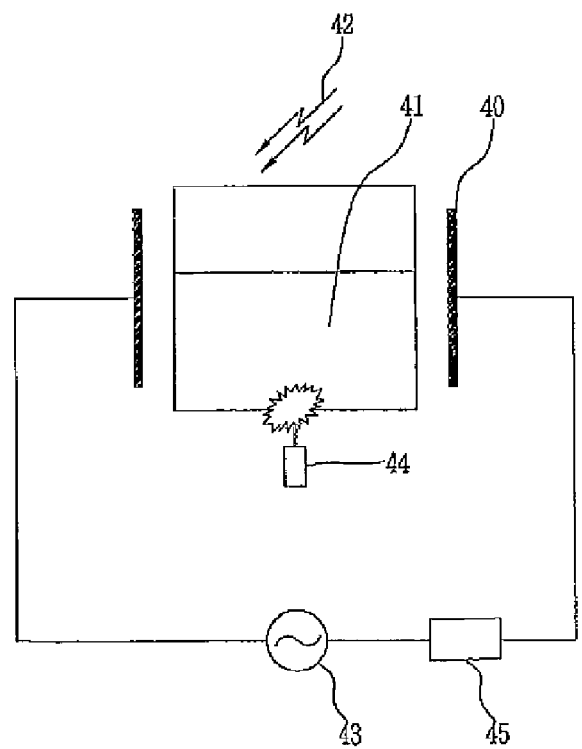

[Fig. 6]
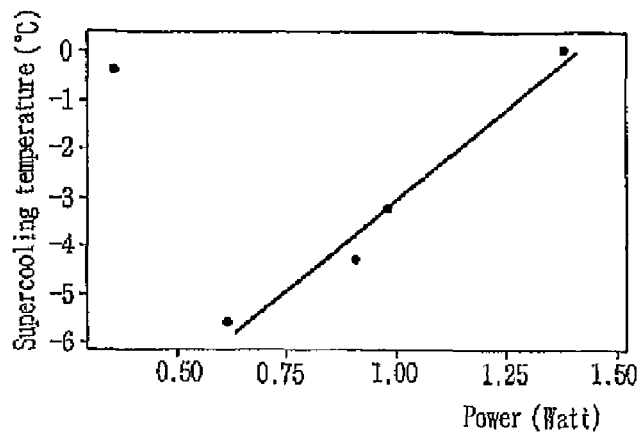
[Fig. 7]
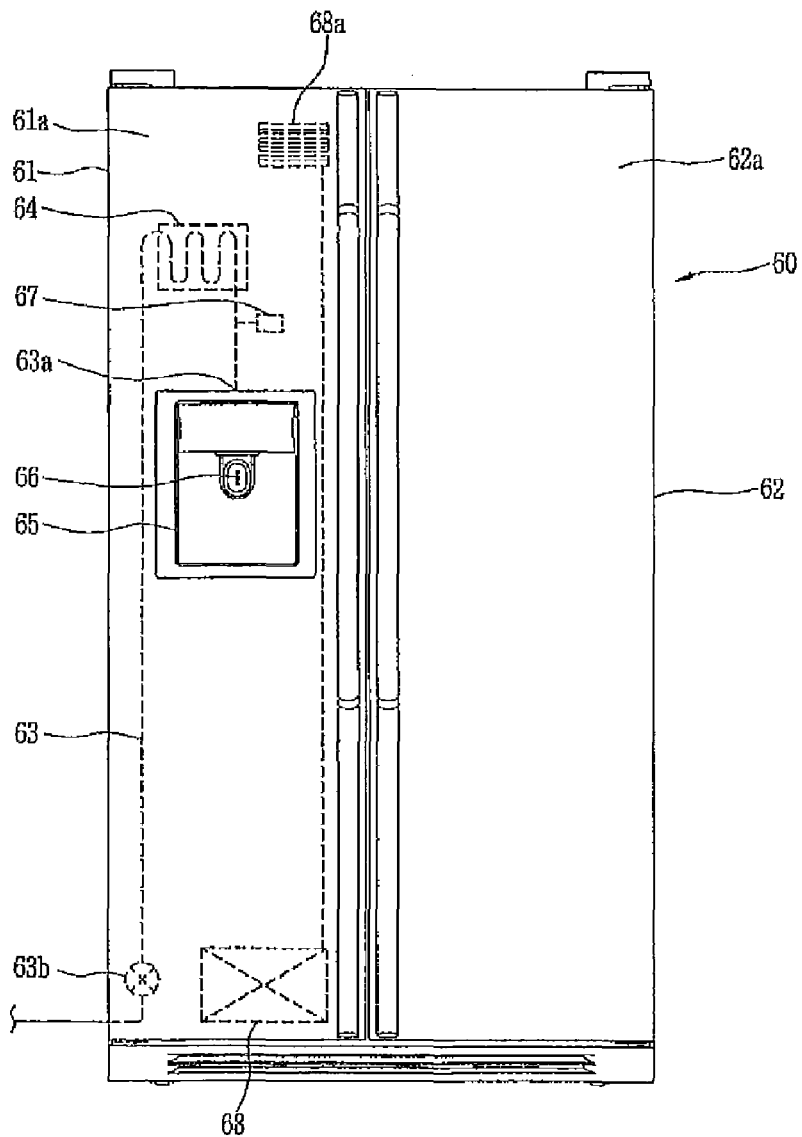

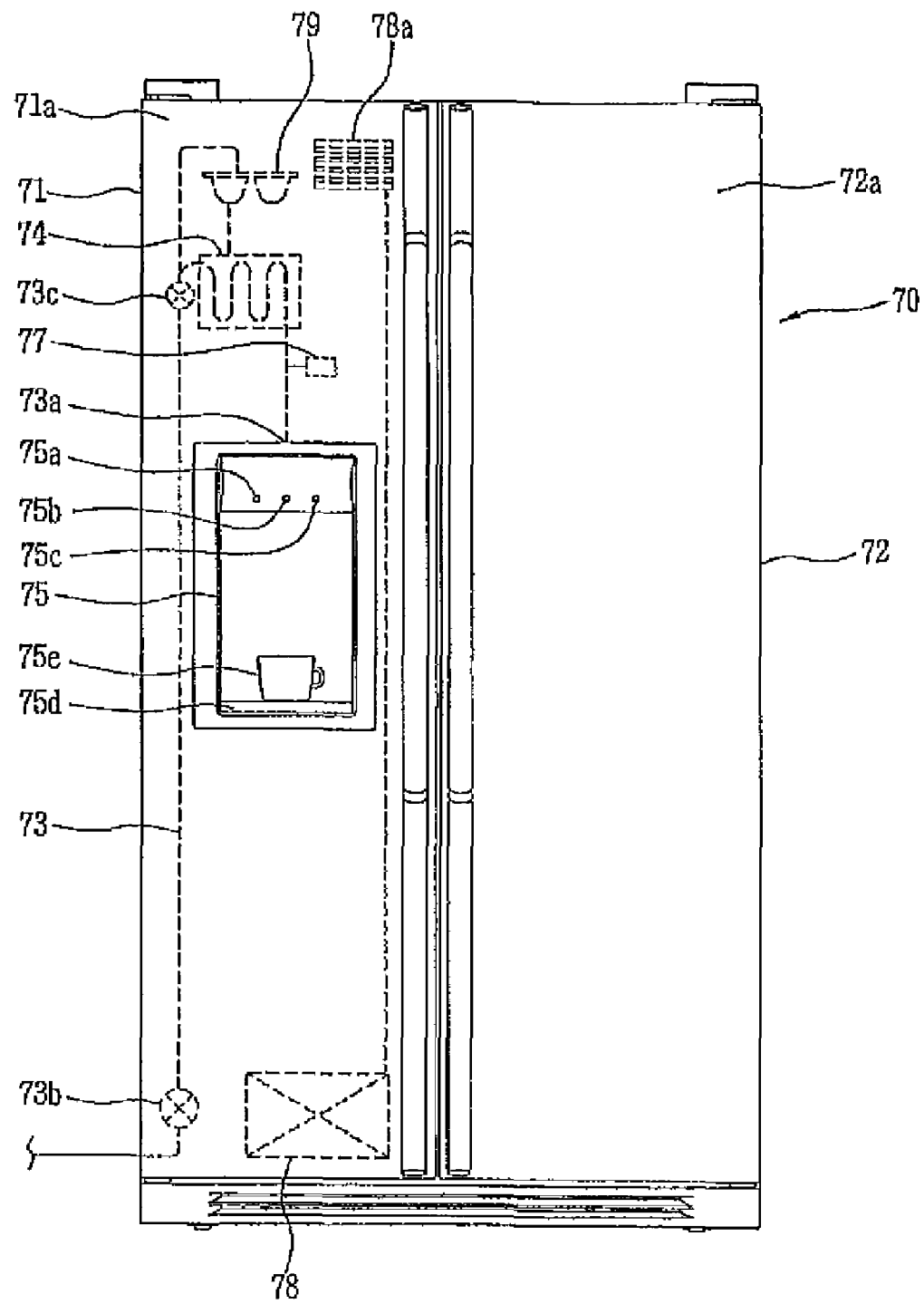
[Fig. 8]

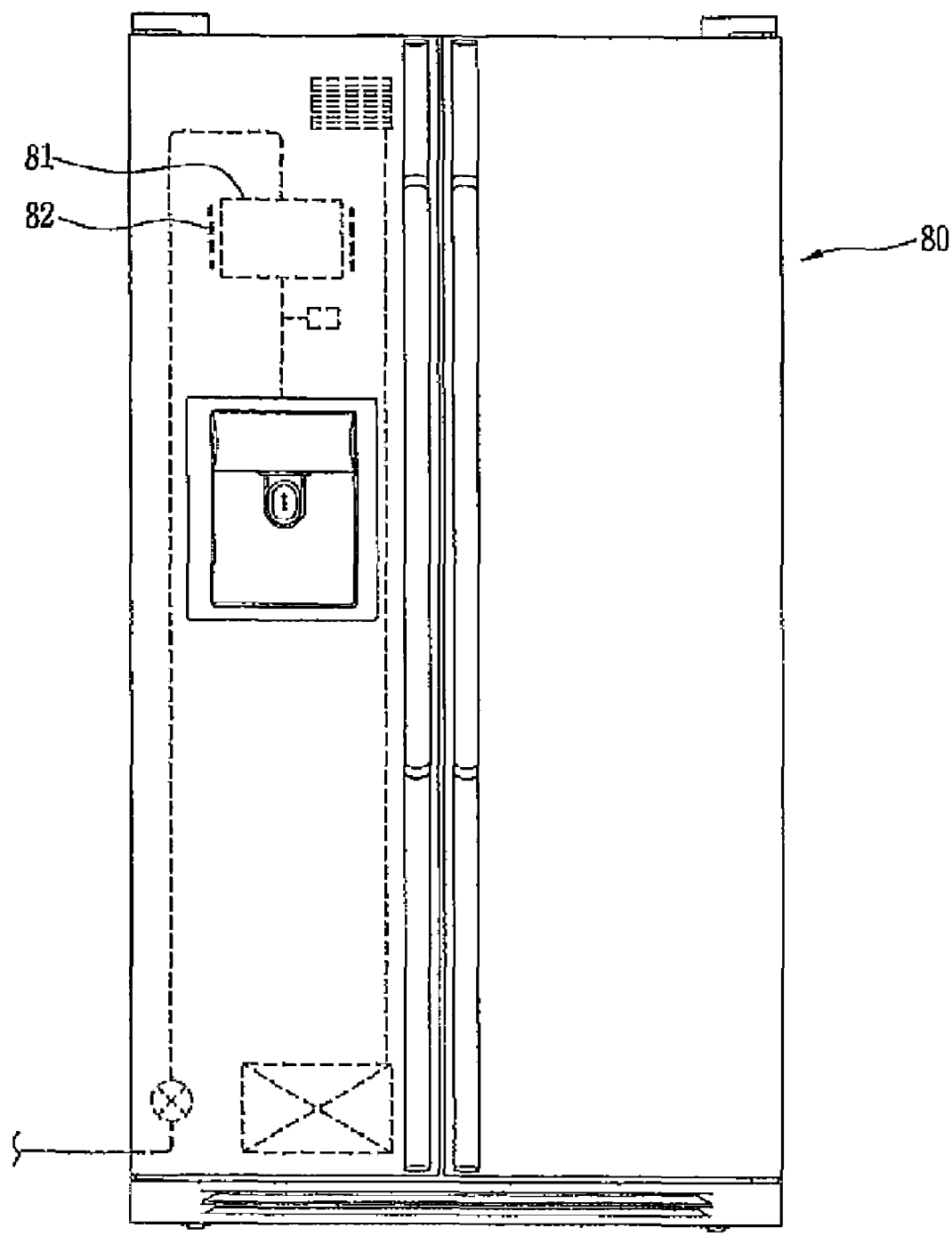
[Fig. 9]

[Fig. 10]
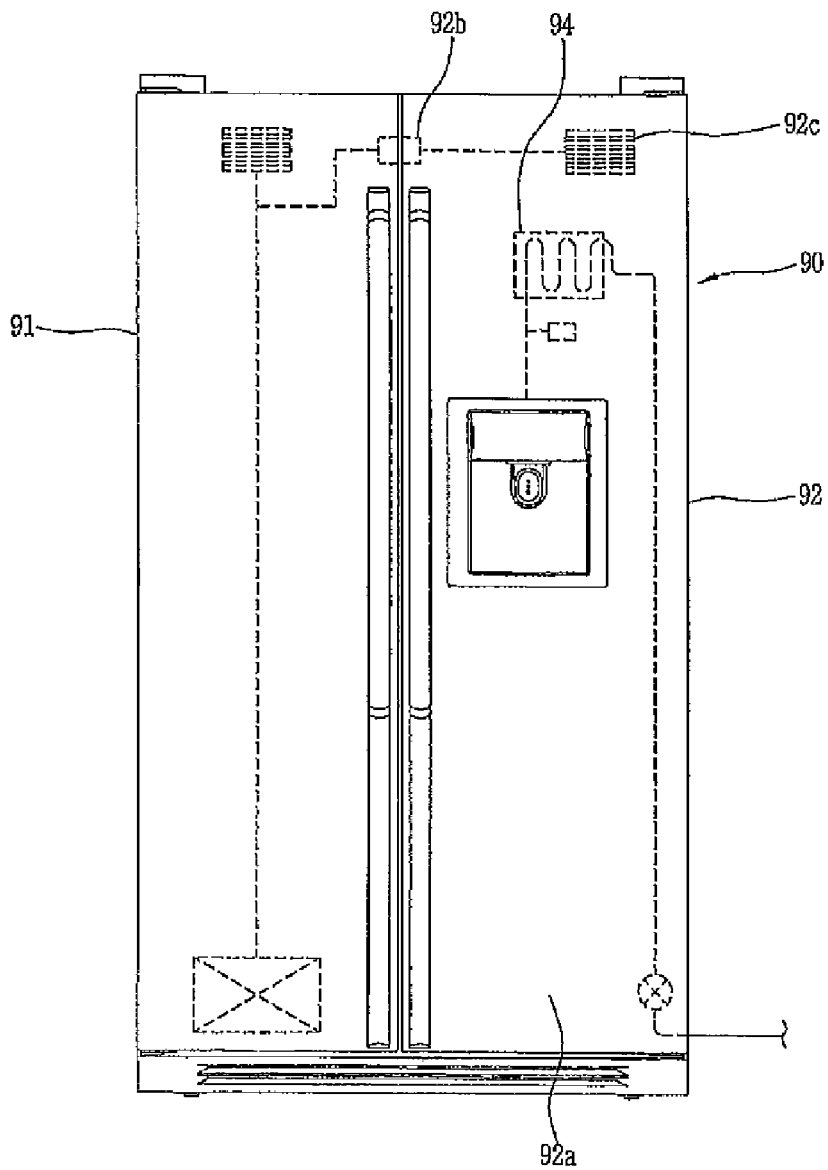
[Fig. 11]
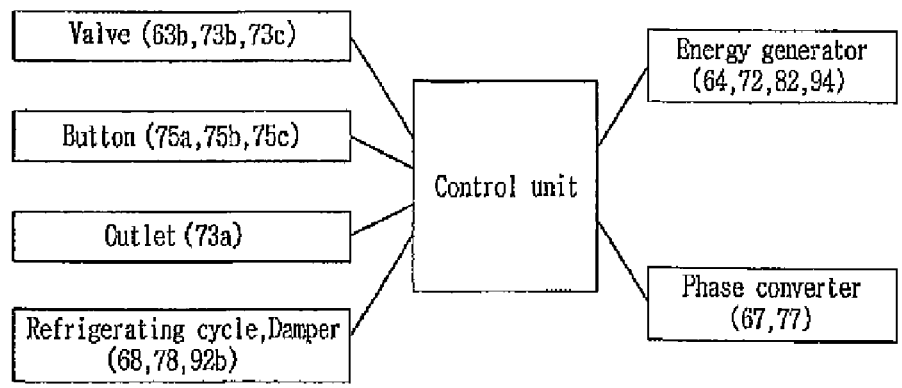

[Fig. 12]
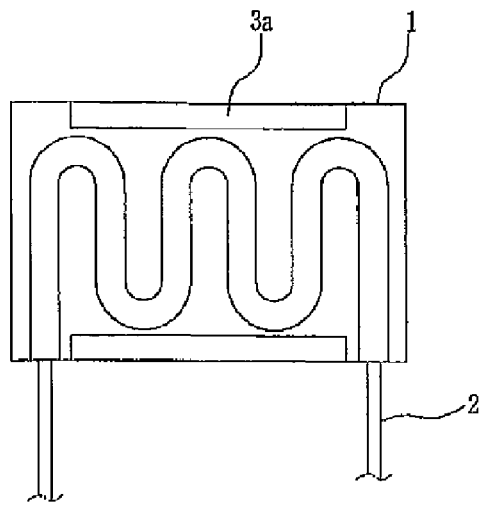
[Fig. 13]
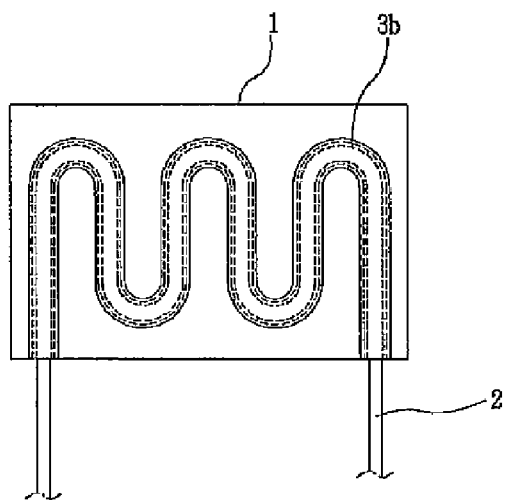
[Fig. 14]
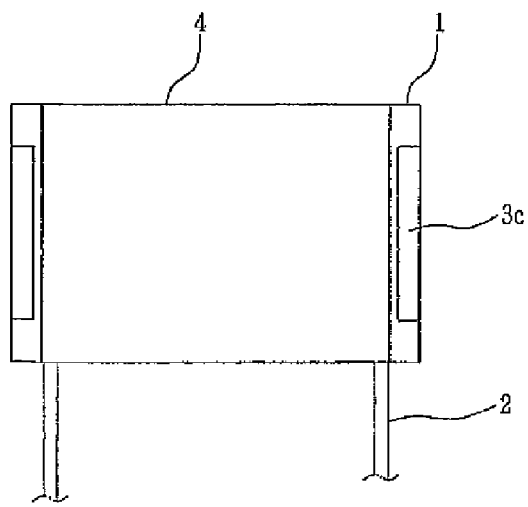

[Fig. 15]
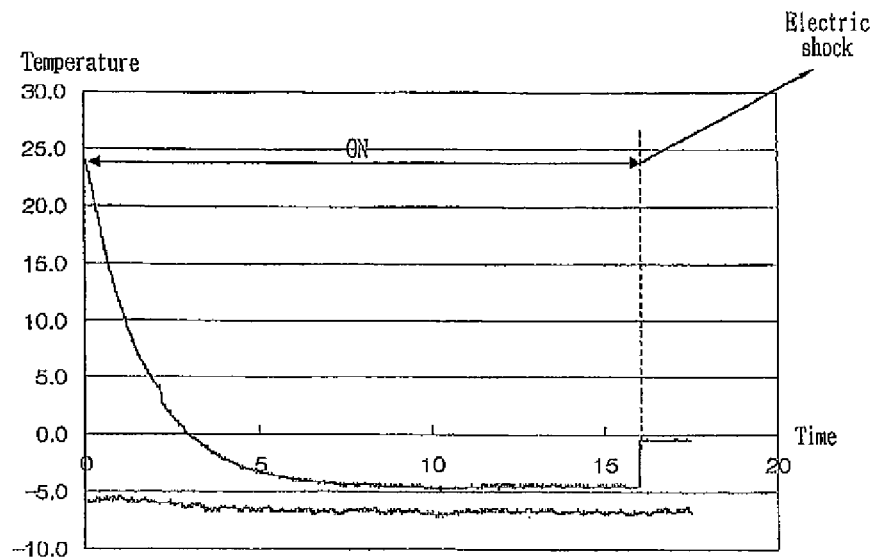
[Fig. 16]
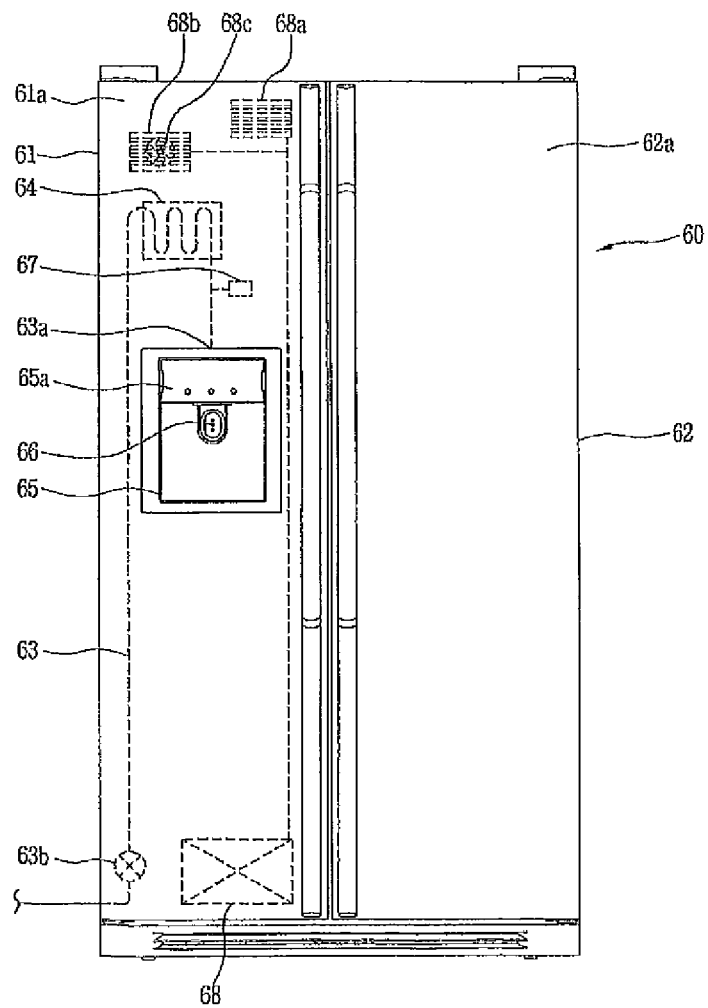

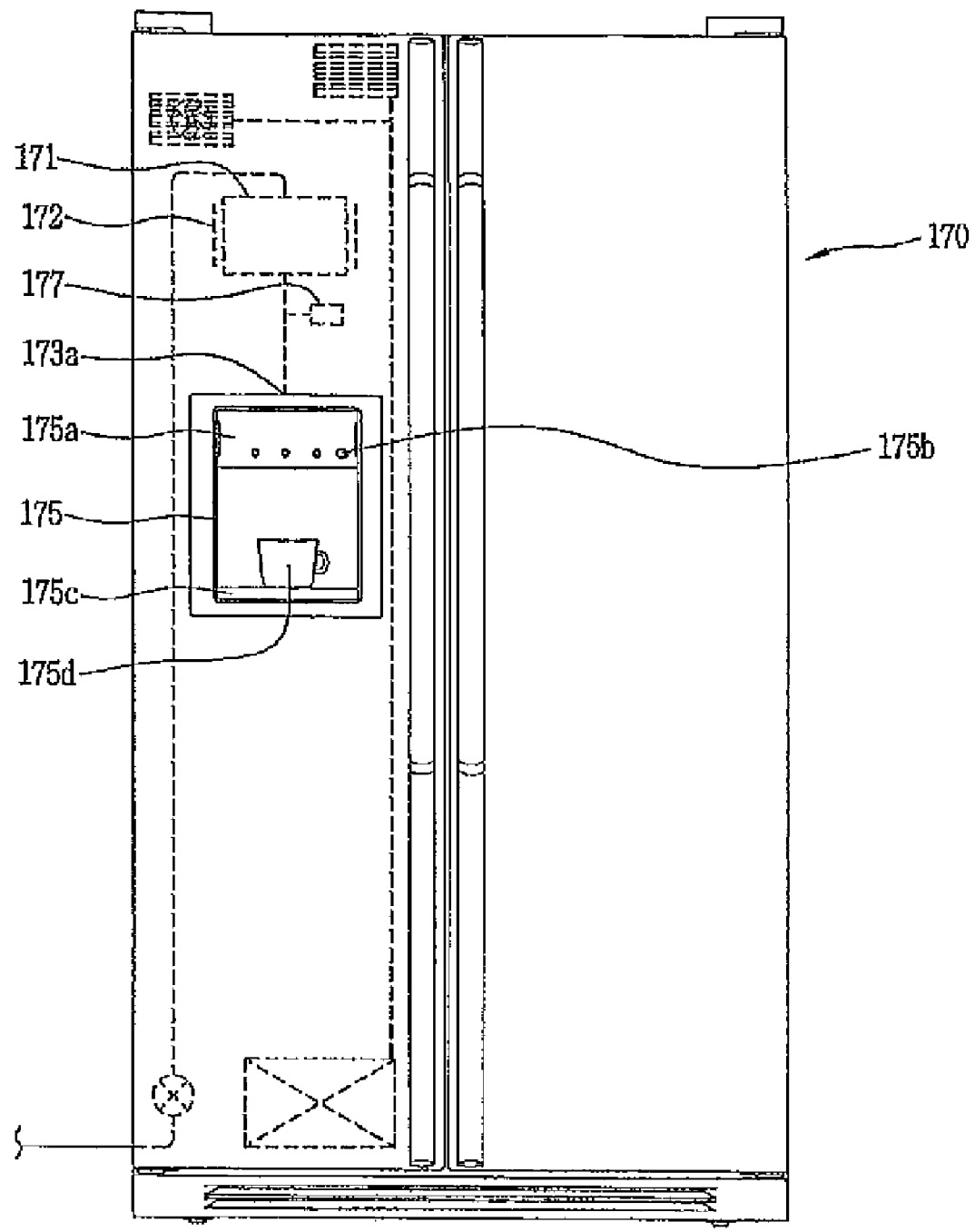
[Fig. 17]

[Fig. 18]
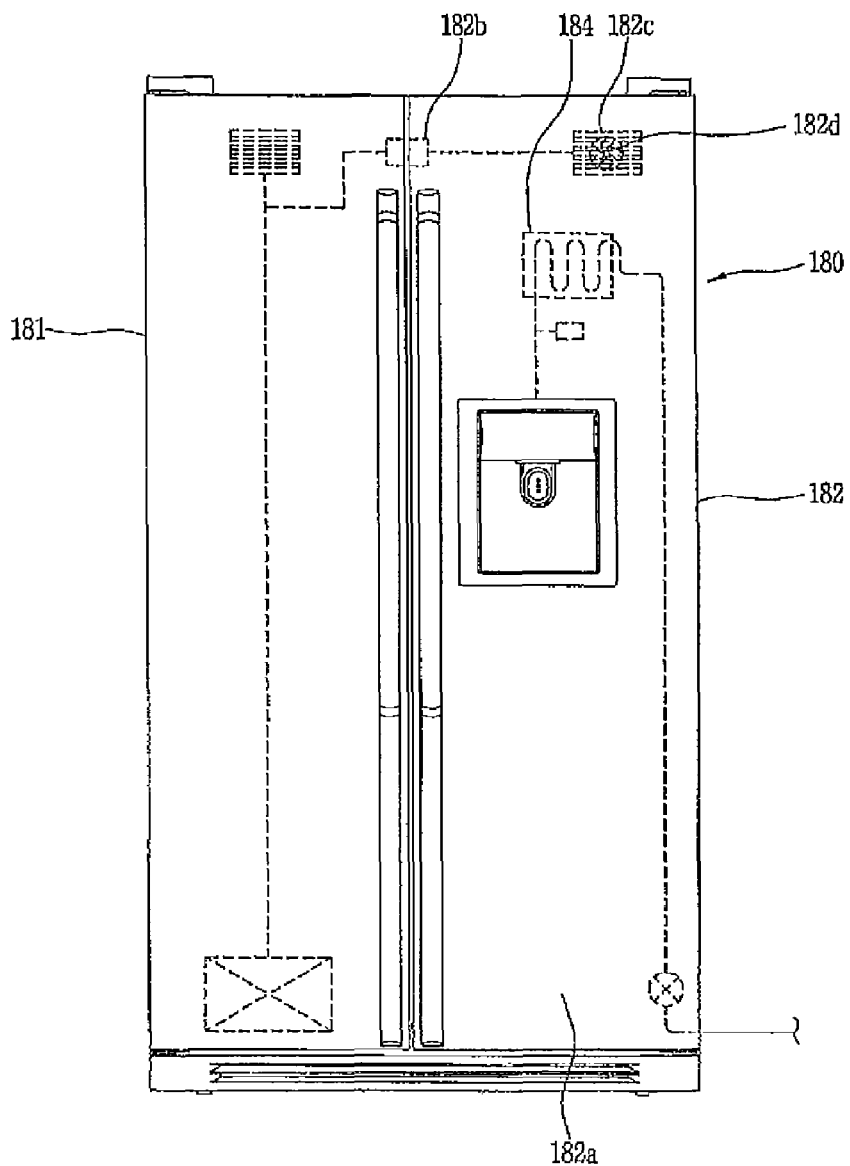
[Fig. 19]
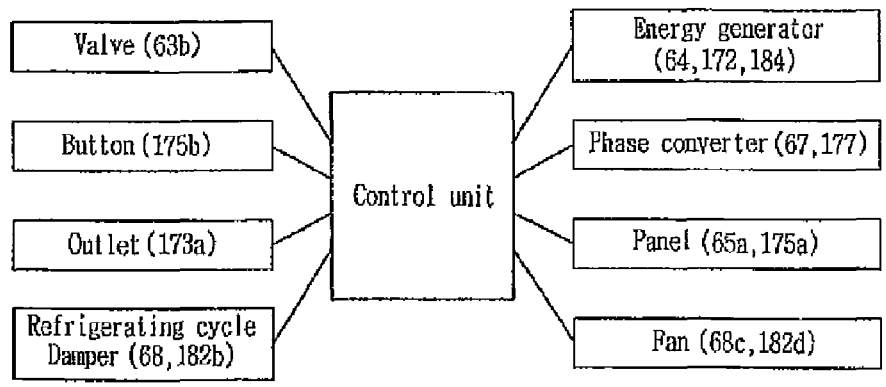

[Fig. 20]
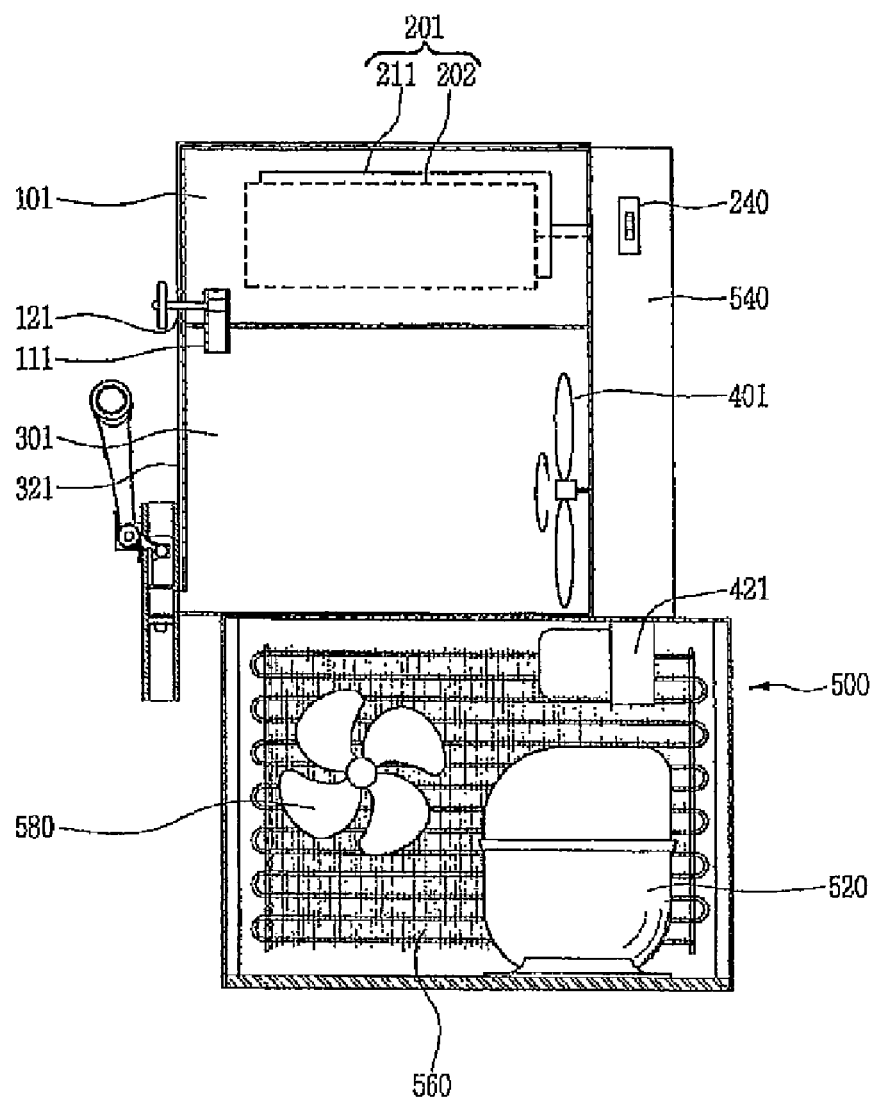
[Fig. 21]
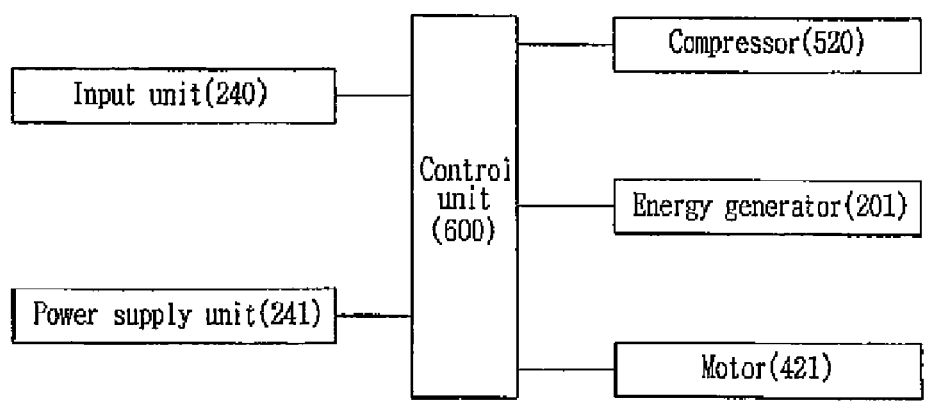

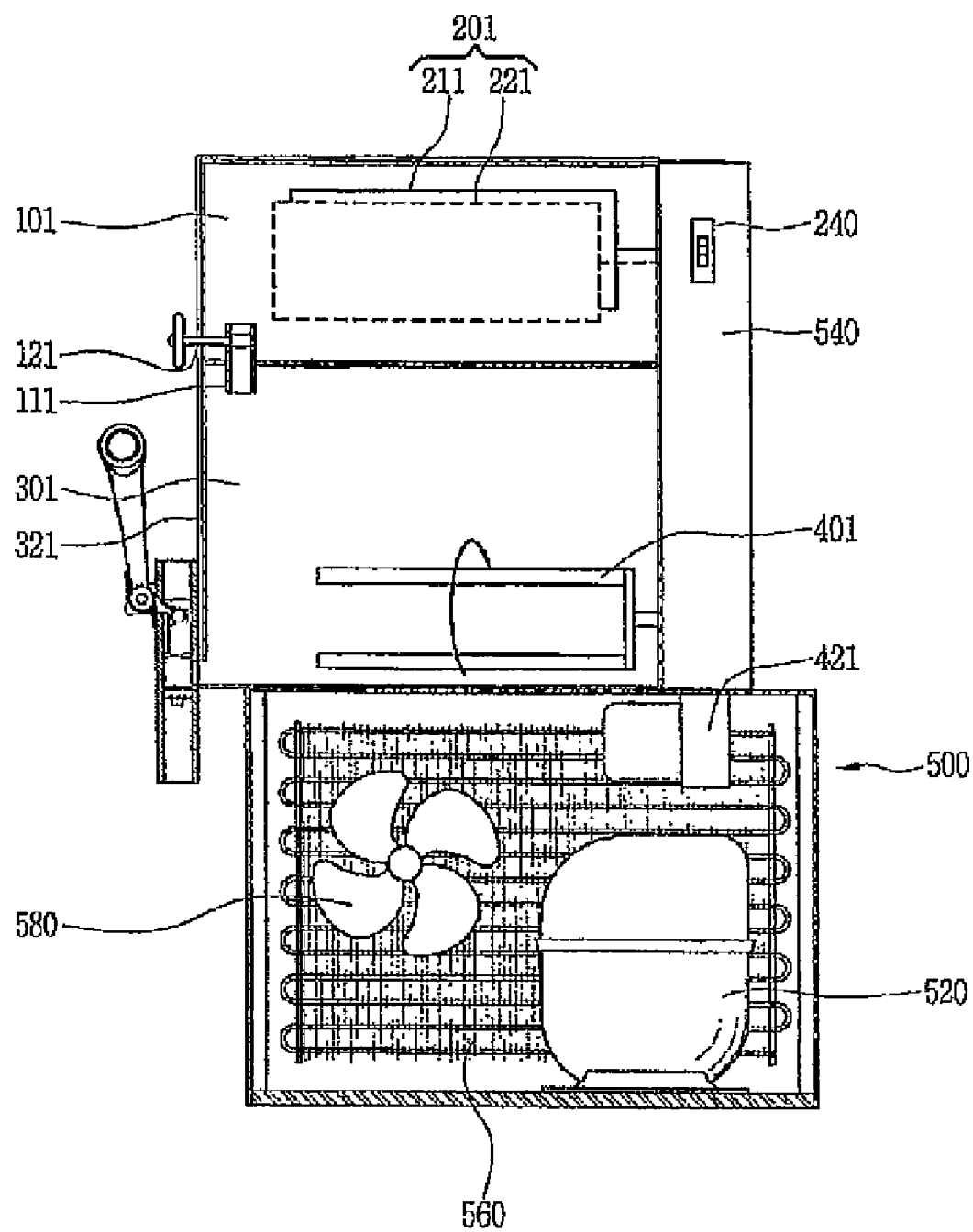
[Fig. 22]

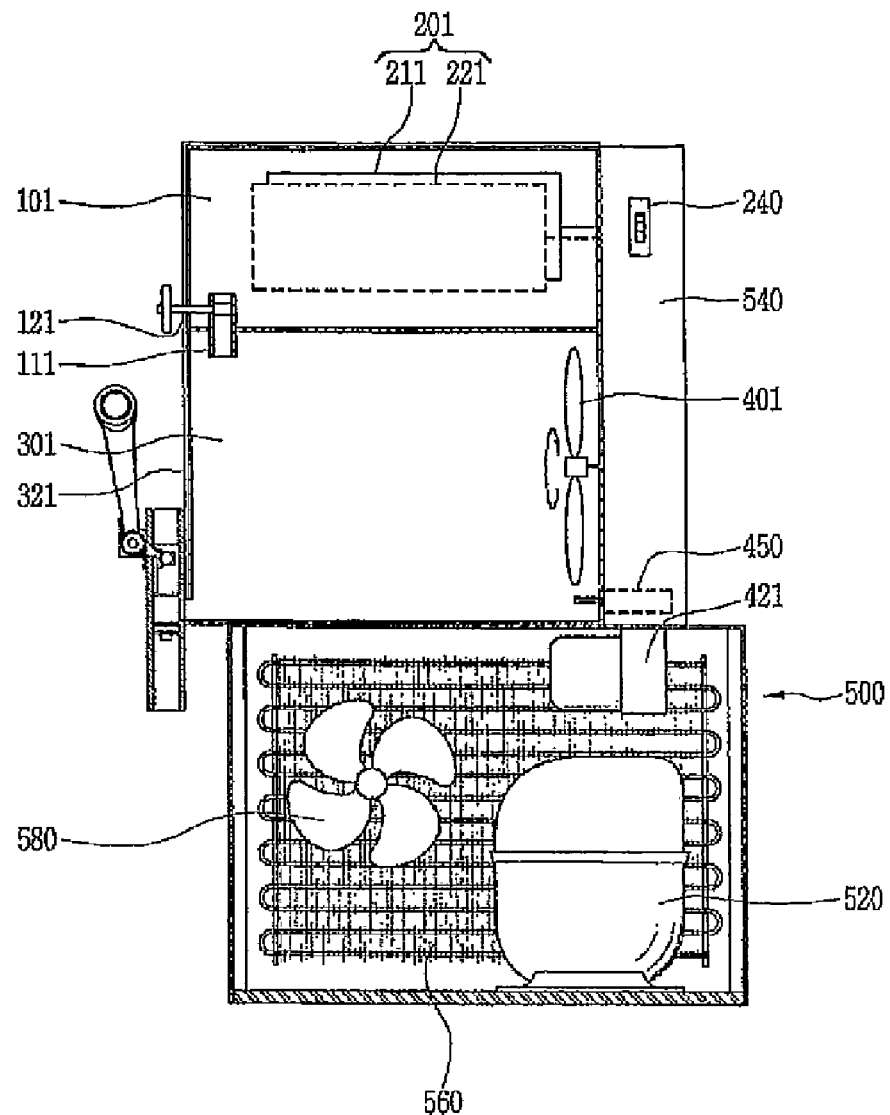
[Fig. 23]
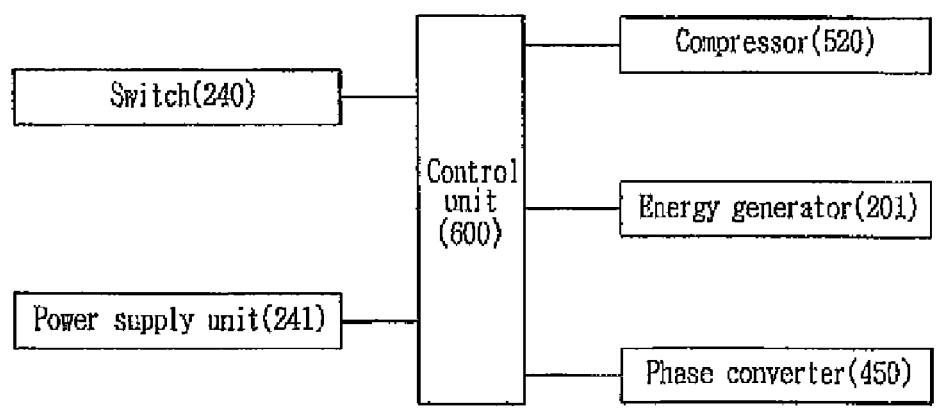
[Fig. 24]

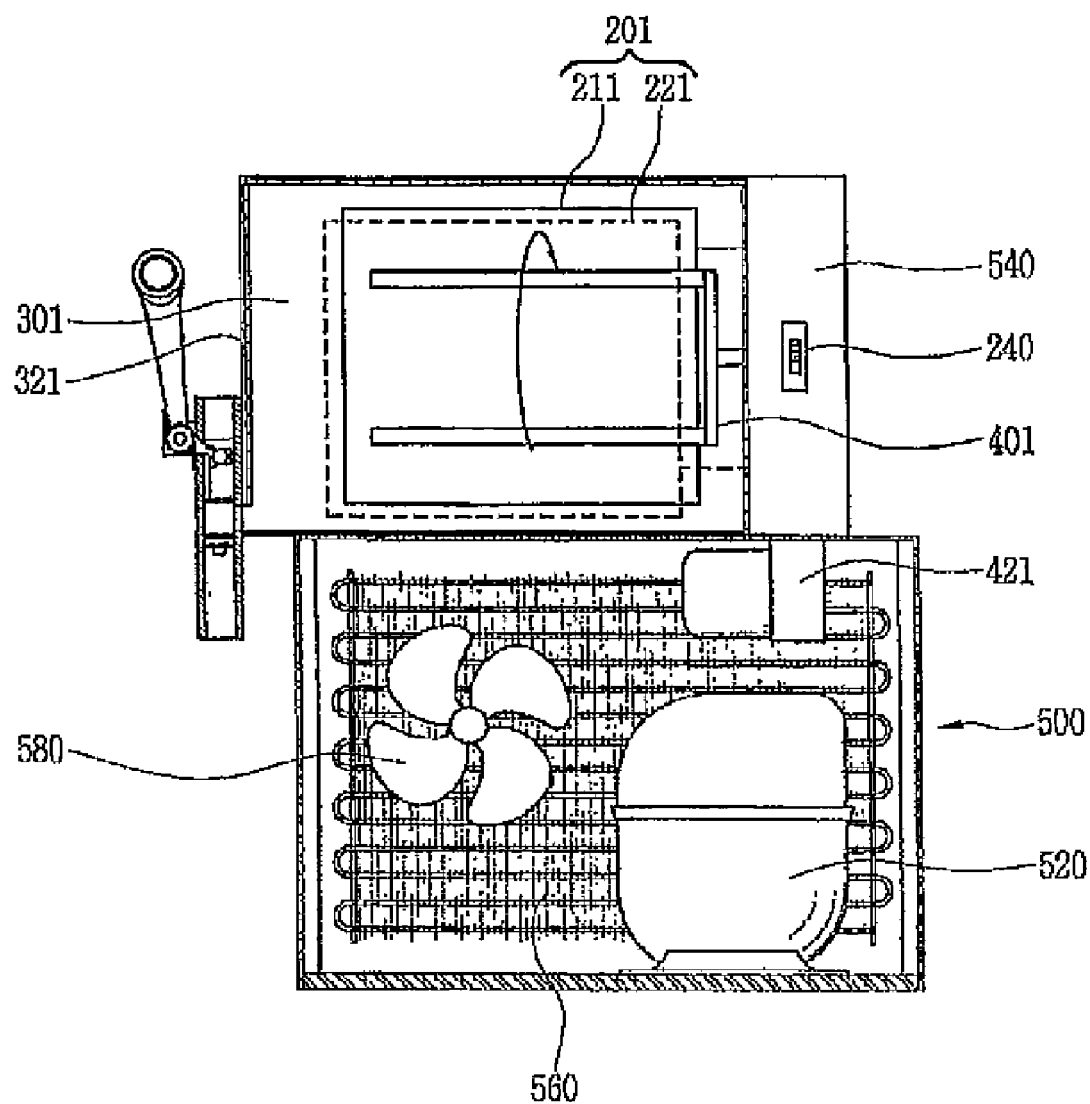
[Fig. 25]

APPARATUS FOR SUPERCOOLING AND METHOD OF MAKING SLUSH THROUGH SUPERCOOLING

TECHNICAL FIELD

The present invention relates to an apparatus for supercooling and a method of making slush through supercooling, and more particularly, to an apparatus for supercooling and a method of making slush through supercooling which can generate a supercooled liquid by supplying cool air and energy, control the state of the supercooled liquid, store and supply the supercooled liquid, generate slush by applying an external force to the supercooled liquid, maintain the state of the slush, and supply the slush.

BACKGROUND ART

Supercooling means that a liquid such as water is not transited to a solid but maintained in a high temperature phase, namely, a liquid phase even below a phase transition temperature to the solid. Water drops can be supercooled in the natural state. In addition, water or beverages may be incidentally supercooled in a general refrigerator. A freezing method disclosed under Japan Laid-Open Patent Official Gazette S59-151834 and a freezing method and a refrigerator disclosed under Japan Laid-Open Patent Official Gazette 2001-086967 apply the supercooling principle to the refrigerator. An electric field or a magnetic field is applied to foods of the refrigerator, so that the foods can be maintained in a supercooled state below a phase transition temperature. An electrostatic field processing method disclosed under International Publication Official Gazette WO/98/41115 suggests various types of electrode structures that can be used to supercool and thaw foods.

FIG. 1 is a structure view illustrating a refrigerator including a dispenser disclosed under Korea Laid-Open Patent Official Gazette 2001-0107286. The refrigerator 100 includes the dispenser 120 on a freezing chamber door 110. The dispenser 120 has operation levers 140 and a support 150 on an outlet unit 130.

FIG. 2 is a structure view illustrating a refrigerator including a dispenser disclosed under Korea Laid-Open Patent Official Gazette 2003-0050929. The refrigerator 200 includes the dispenser 220 on a refrigerating chamber door 210.

FIG. 3 is a structure view illustrating another example of the refrigerator including the dispenser. The refrigerator 300 includes a freezing chamber 310 and a refrigerating chamber 320. An ice maker 330 is installed in the freezing chamber 310, and the dispenser 350 is installed on the freezing chamber door 340. A passage 360 is formed to supply water to the ice maker 330 and the dispenser 350, and connected to an external water supply source (not shown). A first valve 370, a filter 380 and a second valve 390 are disposed on the passage 360. The first valve 370 controls water supply from the external water supply source to the refrigerator 300, the filter 380 filters water, and the second valve 390 controls water supply to the ice maker 330 and the dispenser 350. On the other hand, the first valve 370 and the second vale 390 are controlled by a control unit (not shown) of the refrigerator 300. The passage 360 includes a passage 361 for supplying water to the dispenser 350. Water flowing through the passage 361 is cooled by heat exchange with the freezing chamber 310, and discharged through an outlet 362 of the passage 361 or an outlet 351 of the dispenser 350.

FIG. 4 is a structure view illustrating a slush apparatus disclosed under Korea Laid-Open Patent Official Gazette 1998-076685. The slush apparatus includes a refrigerating cycle 410, a container 420 disposed at the upper portion of the refrigerating cycle 410, for making slush, a screw 430 rotatably installed in the container 420, and a valve means 440 for taking out the slush. The slush apparatus makes the slush by supplying cool air to the container 420 by using the refrigerating cycle 410 and preventing the slush from being transformed into ice by rotation of the screw 430, and supplies the slush by using the valve means 440.

DISCLOSURE OF INVENTION

Technical Problem

An object of the present invention is to provide an apparatus for supercooling and a method of making slush through supercooling.

Another object of the present invention is to provide an apparatus for supercooling and a method of making slush through supercooling which can generate a supercooled liquid by supplying cool air and energy, control the state of the supercooled liquid, store and supply the supercooled liquid, generate slush by applying an external force to the supercooled liquid, maintain the state of the slush, and supply the slush.

Yet another object of the present invention is to provide an apparatus for supercooling and a method of making slush through supercooling which can control a state of a supercooled liquid and/or a degree (softness) of slush made from the supercooled liquid by adjusting a supercooling temperature of the liquid.

Yet another object of the present invention is to provide an apparatus for supercooling and a method of making slush through supercooling which can maintain a state of slush made from a supercooled liquid.

Yet another object of the present invention is to provide an apparatus for supercooling and a method of making slush through supercooling which can make a supercooled liquid and/or slush by using a dispenser structure of a refrigerator.

Yet another object of the present invention is to provide an apparatus for supercooling and a method of making slush through supercooling which can selectively supply ice, supercooled liquid and slush.

Technical Solution

In order to achieve the above-described objects of the invention, there is provided an apparatus for supercooling, including: a supercooled liquid; a cool air supplier for supplying cool air to the supercooled liquid; and an energy generator for supplying energy to the supercooled liquid to maintain the supercooled state. The apparatus for supercooling can be formed as an individual apparatus, part of a refrigerator or part of a slush maker, which is not intended to be limiting.

In another aspect of the present invention, the apparatus for supercooling includes an outlet for discharging the supercooled liquid. The outlet can be formed as an outlet of an individual apparatus for supercooling, formed on a door of a refrigerator, or formed as an outlet of a container containing a supercooled liquid in a slush maker. It is not intended to be limiting.

In another aspect of the present invention, the apparatus for supercooling includes a valve for opening and closing the outlet. By this configuration, the supercooled liquid can be supplied to a cup or a slush apparatus.

In another aspect of the present invention, the apparatus for supercooling includes a regulator for regulating a quantity of energy supplied to the supercooled liquid by the energy generator.

In another aspect of the present invention, the apparatus for supercooling includes a panel cooperating with at least one of the cool air supplier and the energy generator, for controlling a temperature of the supercooled liquid. Here, the temperature of the supercooled liquid can be controlled by adjusting the temperature or quantity of the supplied cool air or the quantity of the supplied energy.

In another aspect of the present invention, the apparatus for supercooling includes a phase converter for converting the supercooled liquid into a solid phase.

In another aspect of the present invention, the apparatus for supercooling includes an outlet for discharging slush made by converting the supercooled liquid into the solid phase.

In another aspect of the present invention, the phase converter uses any one of electric energy, mechanical energy and potential energy. The electric energy can be supplied by an electric igniter, the mechanical energy can be supplied by wings, and the potential energy can be supplied by a support separated from the outlet of the supercooled liquid at a predetermined interval.

In another aspect of the present invention, the apparatus for supercooling includes a container for containing the supercooled liquid. The container can be formed as a container for generating and storing a supercooled liquid in a refrigerator, or a container for supplying a supercooled liquid to a container for making and storing slush in a slush apparatus.

According to another aspect of the present invention, there is provided an apparatus for supercooling, including: a supercooled liquid; and a phase converter for converting the supercooled liquid into a solid phase.

In another aspect of the present invention, the apparatus for supercooling includes an electrode for supplying electric energy to the supercooled liquid to maintain the supercooled state. It is one of the preferred embodiments of the present invention.

In another aspect of the present invention, the phase converter is one of an electric igniter for applying an electric shock to the supercooled liquid, a wing for rotating the supercooled liquid, and a support separated from an outlet for discharging the supercooled liquid at a predetermined interval.

According to yet another aspect of the present invention, there is provided an apparatus for supercooling, including: slush made by phase conversion of a supercooled liquid; and a container for containing the slush and maintaining the state of the slush. As known from this configuration, the present invention includes an apparatus for keeping slush made through supercooling as well as an apparatus for making slush from a supercooled liquid. That is, the present invention includes an apparatus for making slush from a supercooled liquid (for example, supercooled watery plain Kimchi, supercooled fruit punch, etc.), and keeping the slush.

In another aspect of the present invention, the apparatus for supercooling includes a stirrer rotated relatively to the container.

In another aspect of the present invention, the apparatus for supercooling includes an energy generator for supplying energy to the container to make the supercooled liquid in the container.

In another aspect of the present invention, the apparatus for supercooling includes a storing tank for storing the supercooled liquid to supply the supercooled liquid to the container.

In another aspect of the present invention, the apparatus for supercooling includes a phase converter for phase-converting the supercooled liquid into slush.

According to yet another aspect of the present invention, there is provided a method of making slush through supercooling, including: a first step for preparing a supercooled liquid; a second step for making slush by converting the supercooled liquid into a solid phase; and a third step for maintaining the slush state.

In another aspect of the present invention, in the first step, the supercooled liquid is prepared by supplying cool air and energy.

In another aspect of the present invention, in the third step, the slush state is maintained by using a wing.

In another aspect of the present invention, to the second step, the phase conversion to the solid is carried out by applying an external force.

According to yet another aspect of the present invention, there is provided an apparatus for supercooling, including: a passage through which a supercooled liquid flows; and a phase converter for applying an external force to convert the supercooled liquid flowing through the passage into a solid phase. By this configuration, the user can make slush without a special operation. The slush means that the supercooled liquid is converted into the solid phase by the external force. The liquid does not have to be water. That is, any kinds of liquids that can be supercooled and converted into slush by an external force can be used.

In another aspect of the present invention, the apparatus for supercooling includes an energy generator for supplying energy to the supercooled liquid to maintain the supercooled state. Energy can be supplied to the liquid or the supercooled liquid in the form of an electric field or a magnetic field. However, energy can be supplied in various types (for example, ultrasonic waves, magnetrons, etc.) so far as it maintains a liquid phase below a phase transition temperature of the liquid. It must be recognized that the present invention includes these types of energy.

In another aspect of the present invention, the apparatus for supercooling includes a cool air supplier for supplying cool air to the supercooled liquid. The cool air supplier is means for supplying cool air to lower a temperature of the liquid or the supercooled liquid. The cool air supplier can adopt direct cooling (using refrigerant tubes) or indirect cooling (supplying cool air by using a fan). On the other hand, the cool air can be transmitted by radiation or conduction. For this, a refrigerator employs a refrigerating cycle including a compressor and a condenser.

In another aspect of the present invention, the passage includes an electric field applied region. It means that energy is supplied in the form of the electric field. The electric field applied region can be formed in a refrigerating chamber side or a freezing chamber side. The electric field can be applied by supplying energy by forming electrodes inside or outside the passage.

In another aspect of the present invention, the apparatus for supercooling includes a water tank disposed on the passage and containing the supercooled liquid. This configuration corresponds to a third embodiment of the present invention.

In another aspect of the present invention, the apparatus for supercooling includes an electrode for applying an electric field to the water tank.

In another aspect of the present invention, the apparatus for supercooling includes an electric igniter for applying an electric force to the supercooled liquid in the water tank. This configuration can form freezing nucleuses so that the supercooled liquid can be converted into a solid phase in the apparatus.

In another aspect of the present invention, the apparatus for supercooling is a refrigerator including a refrigerating cycle, and the cool air supplier is the refrigerating cycle of the refrigerator.

In another aspect of the present invention, the apparatus for supercooling is a refrigerator including a freezing chamber opened and closed by a door, the passage includes an cutlet of the supercooled liquid, and the cutlet is formed at the door of the freezing chamber. This configuration corresponds to a first embodiment of the present invention. Here, the present invention is applied to the general dispenser structure.

In another aspect of the present invention, the apparatus for supercooling is a refrigerator including a freezing chamber which is opened and closed by a door and has an ice maker, and the door of the freezing chamber includes an outlet region for discharging ice made in the ice maker and the supercooled liquid. This configuration corresponds to a second embodiment of the present invention. Both ice and slush can be supplied through the outlet region.

In another aspect of the present invention, the door of the freezing chamber includes a button for selecting discharge of ice and a button for selecting opening of the passage. By this configuration, the ice, the supercooled liquid or the slush can be selectively supplied.

In another aspect of the present invention, the apparatus for supercooling is a refrigerator including a refrigerating chamber, and the energy generator is installed in the refrigerating chamber side. This configuration corresponds to a fourth embodiment of the present invention. That is, the energy generator can be disposed in any one of the freezing chamber and the refrigerating chamber.

In another aspect of the present invention, the energy generator is installed at a door of the refrigerating chamber.

In another aspect of the present invention, a valve for opening and closing the passage is formed on the passage upstream of the energy generator. This configuration make it possible to control supply of the liquid to the energy generator side, thereby stably generating the supercooled liquid in the energy generator.

According to yet another aspect of the present invention, there is provided an apparatus for supercooling, including: a passage through which a supercooled liquid flows; a door having an cutlet connected to the passage for discharging the supercooled liquid; and an energy generator for supplying energy to the supercooled liquid to maintain the supercooled state. By this configuration, the supercooled liquid or slush can be artificially made in a target state (supercooling temperature, slush state, etc.).

In another aspect of the present invention, the energy generator is formed on the passage, for directly supplying energy to the passage. Preferably, electrodes are inserted into a hose forming the passage.

In another aspect of the present invention, the apparatus for supercooling includes a water tank disposed on the passage and containing the supercooled liquid, and the energy generator supplies energy to the water tank.

According to yet another aspect of the present invention, there is provided a method of making slush through supercooling by using an apparatus for supercooling which includes an cutlet for discharging a supercooled liquid, the method including: a first step for supplying a liquid into the apparatus for supercooling; a second step for supplying cool air and energy to the liquid in the apparatus for supercooling to maintain the supercooled state; and a third step for discharging the supercooled liquid through the cutlet of the apparatus for supercooling. Here, the method of making slush through supercooling essentially includes the step for maintaining the supercooled state by supplying the cool air and energy in the apparatus, and the step for discharging the supercooled liquid or slush through the outlet of the apparatus.

In another aspect of the present invention, the method of making slush through supercooling includes a phase converting step for converting the supercooled liquid into a solid phase by applying an external force, prior to the third step.

In another aspect of the present invention, the apparatus for supercooling includes a water tank in which the second step is carried out, and the phase converting step converts the supercooled liquid of the water tank into the solid phase by applying the external force.

In another aspect of the present invention, the method of making slush through supercooling includes a fourth step for converting the supercooled liquid into a solid phase by applying an external force. It means that the supercooled liquid is converted into the slush after being discharged from the outlet of the apparatus.

In another aspect of the present invention, the fourth step applies the external force to the supercooled liquid by using potential energy of the supercooled liquid discharged from the cutlet of the apparatus for supercooling. For this, a support of a dispenser in which a container taking the supercooled liquid is disposed is sufficiently separated from the cutlet to generate freezing cores.

In another aspect of the present invention, the second step supplies energy by using an electric field.

According to yet another aspect of the present invention, there is provided an apparatus for supercooling, including: a storing chamber for supplying cool air; a passage formed to lower a temperature of a liquid by the cool air of the storing chamber, on which an outlet for discharging the liquid is formed; a door on which the cutlet of the passage is formed; an energy generator positioned on the passage, for supplying energy to supercool the liquid, the energy generator including a regulator for regulating a quantity of energy to be supplied; and a panel formed on the door, for selecting a temperature of the supercooled state. By this configuration, the supercooled liquid or slush can be artificially made in a target state (supercooling temperature, slush state, etc.). The temperature of the supercooled liquid can be controlled by adjusting the temperature or quantity of the supplied cool air, or the quantity of the supplied energy.

In another aspect of the present invention, the energy generator includes an electrode for forming an electric field, and the regulator regulates the intensity of the electric field. It means that energy is supplied in the form of the electric field. An electric field applied region can be formed in a refrigerating chamber side or a freezing chamber side. The electric field can be applied by supplying energy by forming the electrode inside or outside the passage. The intensity of the electric field can be controlled by adjusting an intensity of a voltage or current.

In another aspect of the present invention, the apparatus for supercooling includes a cool air regulator for regulating the cool air of the storing chamber supplied to the passage according to selection of the panel. The cool air is supplied by a refrigerating cycle. Preferably, the cool air is regulated by increasing or decreasing the quantity of the cool air supplied to the passage by using a fan.

In another aspect of the present invention, the apparatus for supercooling includes a phase converter for applying an external force to the supercooled liquid to convert the supercooled liquid into a solid phase before being discharged through the cutlet.

In another aspect of the present invention, the apparatus for supercooling includes a support positioned at the lower portion of the outlet at a predetermined interval to convert the supercooled liquid discharged through the cutlet into a solid phase by potential energy. This configuration means that the supercooled liquid is converted into the solid phase by its gravity energy. However, the supercooled liquid discharged from the outlet is not always converted into the solid phase. That is, in case a predetermined external force is not applied, the supercooled liquid maintains the supercooled liquid state according to its generation condition.

According to yet another aspect of the present invention, there is provided an apparatus for supercooling, including: a container for containing slush made by converting a supercooled liquid into a solid phase; a refrigerating cycle for supplying cool air to the container; and a wing rotated relatively to the container.

In another aspect of the present invention, the apparatus for supercooling includes a storing tank for storing the supercooled liquid, the storing tank being positioned to supply the supercooled liquid to the container.

In another aspect of the present invention, the storing tank for storing the supercooled liquid includes an energy generator for supplying energy to maintain the liquid in the supercooled state.

In another aspect of the present invention, the container includes an energy generator for supplying energy to maintain the supercooled liquid in the supercooled state. The supercooled liquid is generated in the container.

In another aspect of the present invention, the container includes a phase converter for applying an external force to convert the supercooled liquid into a solid phase.

In another aspect of the present invention, the energy generator includes a switch for intercepting energy supply. It means that energy needs not to be always continuously supplied. That is, when the supercooled state is stabilized, it is not necessary to supply energy for a predetermined time. Also, energy can be periodically supplied.

In another aspect of the present invention, at least a part of the container is covered with an insulator.

According to yet another aspect of the present invention, there is provided an apparatus for supercooling, including: a container for containing a supercooled liquid; a refrigerating cycle for supplying cool air to the container; and a phase converter for applying an external force to the container to convert the supercooled liquid into a solid phase.

In another aspect of the present invention, the apparatus for supercooling includes a stirrer rotated relatively to the container.

In another aspect of the present invention, the apparatus for supercooling includes a storing tank for storing the supercooled liquid, the storing tank being positioned to supply the supercooled liquid to the container.

In another aspect of the present invention, the container includes an energy generator for supplying energy to maintain the supercooled liquid in the supercooled state. The supercooled liquid is generated in the container.

According to yet another aspect of the present invention, there is provided an apparatus for supercooling, including: a container for containing a supercooled liquid; a refrigerating cycle for supplying cool air to the container; an energy generator for supplying energy to the container to maintain the supercooled liquid in the supercooled state; and a wing rotated relatively to the container, for rotating the supercooled liquid.

In another aspect of the present invention, the wing stirs slush made by converting the supercooled liquid into a solid phase. The apparatus for supercooling includes a control unit for controlling rotation of the wing in the supercooled liquid state and the slush state, respectively.

According to yet another aspect of the present invention, there is provided an apparatus for supercooling, including: a container for containing a supercooled liquid; a refrigerating cycle for supplying cool air to the container; and a wing rotated relatively to the container, and comprised of an electrode for supplying energy to the container to maintain the supercooled liquid in the supercooled state.

According to yet another aspect of the present invention, there is provided an apparatus for supercooling, including: a container for containing a supercooled liquid; a refrigerating cycle for supplying cool air to the container; a wing rotated relatively to the container, for rotating the supercooled liquid, and stirring slush made by converting the supercooled liquid into a solid phase; and a control unit for controlling rotation of the wing in the supercooled liquid state and the slush state, respectively.

In another aspect of the present invention, the apparatus for supercooling includes an energy supplier for supplying energy to the container to maintain the supercooled liquid in the supercooled state.

In another aspect of the present invention, the wing include an electrode for supplying energy to the container to maintain the supercooled liquid in the supercooled state.

In another aspect of the present invention, the wing is formed in a rod shape.

According to yet another aspect of the present invention, there is provided an apparatus for supercooling is disposed closely to an cutlet of the supercooled liquid, namely, on a door, for stably discharging the fragile supercooled liquid to the outside.

Advantageous Effects

In accordance with the present invention, the apparatus for supercooling and the method of making slush through supercooling can generate the supercooled liquid by supplying the cool air and energy, control the state of the supercooled liquid, store and supply the supercooled liquid, generate the slush by applying the external force to the supercooled liquid, maintain the state of the slush, and supply the slush.

In accordance with the present invention, the apparatus for supercooling and the method of making slush through supercooling can control the state of the supercooled liquid and/or the degree (softness) of the slush made from the supercooled liquid by adjusting the supercooling temperature of the supercooled liquid. According to the experiment result of the present inventors, when the temperature of the cool air is maintained constant, the temperature of the supercooled liquid can also be controlled.

In accordance with the present invention, the apparatus for supercooling and the method of making slush through supercooling can maintain the state of the slush made from the supercooled liquid.

In accordance with the present invention, the apparatus for supercooling and the method of making slush through supercooling can make the supercooled liquid and/or the slush by using the dispenser structure of the refrigerator.

In accordance with the present invention, the apparatus for supercooling and the method of making slush through supercooling can selectively supply the ice, supercooled liquid and slush.

In accordance with the present invention, the apparatus for supercooling is disposed closely to the cutlet of the supercooled liquid, namely, on the door, for stably externally discharging the unstable supercooled liquid.

BRIEF DESCRIPTION OF THE DRAWINGS

The present invention will become better understood with reference to the accompanying drawings which are given only by way of illustration and thus are not limitative of the present invention, wherein:

FIG. 1 is a structure view illustrating a refrigerator including a dispenser disclosed under Korea Laid-Open Patent Official Gazette 2001-0107286;

FIG. 2 is a structure view illustrating a refrigerator including a dispenser disclosed under Korea Laid-Open Patent Official Gazette 2003-0050929;

FIG. 3 is a structure view illustrating another example of the refrigerator including the dispenser;

FIG. 4 is a structure view illustrating a slush apparatus disclosed under Korea Laid-Open Patent Official Gazette 1998-076685;

FIG. 5 is a concept view illustrating slush making in accordance with the present invention;

FIG. 6 is a graph showing one example of an experiment result in accordance with the present invention;

FIG. 7 is a structure view illustrating an apparatus for supercooling in accordance with a first embodiment of the present invention;

FIG. 8 is a structure view illustrating an apparatus for supercooling in accordance with a second embodiment of the present invention;

FIG. 9 is a structure view illustrating an apparatus for supercooling in accordance with a third embodiment of the present invention;

FIG. 10 is a structure view illustrating an apparatus for supercooling in accordance with a fourth embodiment of the present invention;

FIG. 11 is a block diagram illustrating a method of operating the apparatus for supercooling in accordance with the present invention;

FIGS. 12 to 14 are exemplary views illustrating configuration of electric field applied regions;

FIG. 15 is a graph showing another example of the experiment result in accordance with the present invention;

FIG. 16 is a structure view illustrating an apparatus for supercooling in accordance with a fifth embodiment of the present invention;

FIG. 17 is a structure view illustrating an apparatus for supercooling in accordance with a sixth embodiment of the present invention;

FIG. 18 is a structure view illustrating an apparatus for supercooling in accordance with a seventh embodiment of the present invention;

FIG. 19 is a block diagram illustrating a method of operating the apparatus for supercooling in accordance with the present invention;

FIG. 20 is a structure view illustrating an apparatus for supercooling in accordance with an eighth embodiment of the present invention;

FIG. 21 is a block diagram illustrating the structure of the apparatus for supercooling in accordance with the eighth embodiment of the present invention;

FIG. 22 is a structure view illustrating another example of wings of the apparatus for supercooling in accordance with the present invention;

FIG. 23 is a structure view illustrating an apparatus for supercooling in accordance with a ninth embodiment of the present invention;

FIG. 24 is a block diagram illustrating the structure of the apparatus for supercooling in accordance with the ninth embodiment of the present invention; and FIG. 25 is a structure view illustrating an apparatus for supercooling in accordance with a tenth embodiment of the present invention.

MODE FOR THE INVENTION

An apparatus for supercooling and a method of making slush through supercooling in accordance with the present invention will now be described in detail with reference to the accompanying drawings.

FIG. 5 is a concept view illustrating slush making in accordance with the present invention. Referring to FIG. 5, a liquid 41 which is a supercooling object is disposed between electrodes 40. In a state where cool air 42 is supplied, an electric field is applied to the liquid 41 by using an AC power source 43. Therefore, the liquid 41 is not frozen but supercooled below its phase transition temperature (for example, water at 0° C. under 1 atm pressure). It is know that supply of energy such as an electric field interrupts hydrogen bonding of water consisting of oxygen and hydrogen, and thus water is not frozen. When an external force is applied to the supercooled liquid by a phase converter 44, for example, when an electric force is applied to the supercooled liquid by an electric igniter, the supercooled state maintained by the energy which is being applied to the supercooled liquid or the energy which has been applied to the supercooled liquid (it means that the supercooled state can be maintained although energy supply is interrupted after a predetermined time) is disturbed by the force. Accordingly, freezing cores are formed, and the supercooled liquid is rapidly converted into a solid phase, thereby generating slush. Here, a temperature of the supercooled liquid is changed from a supercooled state temperature to a phase transition temperature. The slush state after phase transition is influenced by the temperature of the supercooled liquid before phase transition (the temperature of the supercooled state). If the temperature of the supercooled state is low (approximate to the phase transition temperature), the amount of ice in the slush is relatively small (soft slush). Such a difference influences the taste of the user and the use of the slush. The temperature of the supercooled state can be controlled by adjusting the temperature and quantity of the cool air supplied to the supercooled liquid. In case the temperature and quantity of the cool air are constant, the temperature of the supercooled liquid can be controlled by adjusting the quantity of the supplied energy (explained below with reference to FIG. 6). The intensity of the electric field supplied to the supercooled liquid by the AC power source 43 through the electrodes 40 or the quantity of the energy can be regulated by a regulator 45. The intensity of the electric field can be controlled by adjusting a supplied current or voltage.

The experiment result of the present invention will now be explained.

1. Installation of Electrodes and Container

Two electrodes having width and length of 100 mm were installed at an interval of 200 mm. A container containing 1L of water was positioned between the two electrodes at a predetermined interval.

2. Supercooling

The above apparatus was put in a refrigerator having a temperature of −6.8° C., and an electric field of 40 kHz and 2 kV was applied thereto. As soon as the apparatus was put into the refrigerator, the electric field was applied to the apparatus. After sufficient supercooling, the supercooled liquid was converted into a solid phase by using an electric igniter for 1500V electric lighter. The result was shown in FIG. 15.

FIG. 6 is a graph showing one example of the experiment result, especially, correlation between the applied power and the temperature of the supercooled liquid. As shown in FIG. 6, the applied power and the temperature of the supercooled liquid show almost linear proportion. It means that, in the given ambient temperature, the set temperature of the supercooled liquid can be controlled by adjusting power applied from an energy generator.

FIG. 7 is a structure view illustrating an apparatus for supercooling in accordance with a first embodiment of the present invention. The apparatus 60 for supercooling includes a freezing chamber 61 and a refrigerating chamber 62. A freezing chamber door 61a is formed on the freezing chamber 61, and a refrigerating chamber door 62b is formed on the refrigerating chamber 62. A passage 63 supplied with water from an external source is formed at the freezing chamber 61. An energy generator or an electric field applied region 64 is formed on the passage 63. An cutlet 63a for discharging water is formed at one end of the passage 63. In addition, a valve 63b for controlling water supply from an external water supply source (not shown) to the electric field applied region 64 is formed at the other end of the passage 63. The cutlet 63a is linked to an cutlet unit 65 formed on the freezing chamber door 61a, and an operating lever 66 for opening and closing the cutlet 63a is formed in the outlet unit 65. An electric igniter 67 which is a phase converter is installed between the cutlet 63a and the electric field applied region 64. Here, cool air is generated by a refrigerating cycle 68 disposed at the lower portion of the apparatus 60 for supercooling, and supplied to the freezing chamber 61 thrash a discharge hole 68a connected to the refrigerating cycle 68. The cool air can be supplied thrash refrigerant tubes (not shown) formed to surround the freezing chamber 61.

A method of operating the apparatus for supercooling in accordance with the present invention will now be explained with reference to FIG. 11.

When the valve 63b is opened, water is supplied from the external water supply source (not shown) to the passage 63. The water exchanges heat with the cool air of the freezing chamber 61 and is supercooled without phase transition by the electric field type energy in the energy generator or the electric field applied region 64. When the user presses the operating lever 66 by using a cup (not shown), the supercooled water is discharged through the outlet 63a. When the supercooled water is discharged, the supercooled water is phase-transited by the operation of the phase converter or the electric igniter 67. The supercooled water contained in the cup is converted into a solid phase, thereby making slush. This operation is controlled by a control unit of the apparatus 60 for supercooling which controls the refrigerating cycle 68.

FIG. 8 is a structure view illustrating an apparatus for supercooling in accordance with a second embodiment of the present invention. Differently from the first embodiment of the present invention, the apparatus 70 for supercooling further includes a general ice maker 79. The apparatus 70 for supercooling includes a freezing chamber 71 and a refrigerating chamber 72. A freezing chamber door 71a is formed on the freezing chamber 71, and a refrigerating chamber door 72b is formed on the refrigerating chamber 72. A passage 73 supplied with water from an external source is formed at the freezing chamber 71. An energy generator or an electric field applied region 74 is formed on the passage 73. An outlet 73a for discharging water is formed at the end of the passage 73. In addition, a valve 73b for controlling water supply from an external water supply source (not shown) to the passage 73, and a valve 73c for controlling water supply to the electric field applied region 74 and the ice maker 79 are formed on the passage 73. The outlet 73a is linked to an cutlet unit 75 formed on the freezing chamber door 71a, and buttons 75a, 75b and 75c for selecting discharge of ice, supercooled liquid or slush are formed at the upper portion of the cutlet unit 75. A support 75d is formed at the lower portion of the cutlet unit 75, and a cup 75e is positioned on the support 75d. An electric igniter 77 which is a phase converter is installed between the cutlet 73a and the electric field applied region 74. Here, cool air is generated by a refrigerating cycle 78 disposed at the lower portion of the apparatus 70 for supercooling, and supplied to the freezing chamber 71 through a discharge hole 78a connected to the refrigerating cycle 78. The cool air can be supplied through refrigerant tubes (not shown) formed to surround the freezing chamber 71.

A method of operating the apparatus for supercooling in accordance with the present invention will now be explained with reference to FIG. 11.

When the valve 73b is opened, water is supplied from the external water supply source (not shown) to the passage 73. The water is supplied to the energy generator or the electric field applied region 74 and the ice maker 79 by the operation of the valve 73c. The water is iced in the ice maker 79 by the cool air of the freezing chamber 71, and supercooled without phase transition by the electric field type energy in the electric field applied region 74. When the user puts the cup 75e on the support 75d and selects one of the buttons 75a, 75b and 75c, the ice, supercooled liquid or slush is supplied to the cup 75e through the outlet unit 75. If the user operates the phase converter or the electric igniter 77, the slush is provided, and if not, the supercooled liquid is provided. One may think that, while the supercooled liquid is supplied to the cup 75e through the passage 73, freezing cores are formed and the supercooled liquid is converted into the slush. However, in accordance with the present invention, although the supercooled liquid made by using the energy generator is supplied from the energy generator to another container, the supercooled liquid is not converted into the slush according to its generation condition. That is, the phase converter serves to facilitate slush making and generate freezing cores for slush making. Instead of installing the phase converter on the passage 73, it is possible to position a support 73e to form freezing cores by potential energy of the supercooled liquid discharged from the cutlet 73a (for example, 20 cm, variable by the supercooling condition). This operation is controlled by a control unit of the apparatus 70 for supercooling which operates the refrigerating cycle 78.

FIG. 9 is a structure view illustrating an apparatus for supercooling in accordance with a third embodiment of the present invention. The apparatus 80 for supercooling includes a water tank 81 in an electric field applied region. Except that energy is supplied to the water tank 81 by using electrodes 82, the apparatus 80 is identical to the apparatus 60 of FIG. 7. As compared with the case in that energy is applied directly to the supercooled water on the passage, supercooled water is stably generated and supplied (refer to FIG. 11).

FIG. 10 is a structure view illustrating an apparatus for supercooling in accordance with a fourth embodiment of the present invention. Except that an electric field applied region 94 is formed in a refrigerating chamber door 92a, the apparatus 90 is identical to the apparatus 60 of FIG. 7. In this case, a discharge hole 92c positioned adjacent to the electric field applied region 94, for supplying cool air supplied from a freezing chamber side 91 through a damper 92b to the electric field applied region 94 can be formed to lower a temperature of water below a phase transition temperature (refer to FIG.

11). By this configuration, the present invention can be applied to a refrigerator including a dispenser in a refrigerating chamber. In this case, the electric field applied region is preferably formed in the refrigerating chamber side. If the electric field applied region is positioned in the freezing chamber side, the passage of the supercooled water is lengthened. This long passage can make it difficult to control the supercooled water and slush.

FIGS. 12 to 14 are exemplary views illustrating configuration of electric field applied regions. In FIG. 12, a passage 2 passes through an electric field applied region 1, and electrodes 3a are formed outside the passage 2. In FIG. 13, a passage 2 passes through an electric field applied region 1, and electrodes 3b are formed in a hose forming the passage 2. In FIG. 14, an electric field applied region 1 is formed on a passage 2, a water tank 4 is formed in the region 1, and electrodes 3c are formed at the side of the water tank 4. Preferably, the electric field applied region is made of an electric insulator.

FIG. 16 is a structure view illustrating an apparatus for supercooling in accordance with a fifth embodiment of the present invention. The apparatus 60 for supercooling includes a freezing chamber 61 and a refrigerating chamber 62. A freezing chamber door 61a is formed on the freezing chamber 61, and a refrigerating chamber door 62b is formed on the refrigerating chamber 62. A passage 63 supplied with water from an external source is formed at the freezing chamber 61. An energy generator or an electric field applied region 64 is formed on the passage 63. An outlet 63a for discharging water is formed at one end of the passage 63. In addition, a valve 63b for controlling water supply from an external water supply source (not shown) to the electric field applied region 64 is formed at the other end of the passage 63. The cutlet 63a is linked to an cutlet unit 65 formed on the freezing chamber door 61a, and an operating lever 66 for opening and closing the outlet 63a and a panel 65a for allowing the user to select a temperature of the supercooled liquid to decide a state or degree of slush are formed in the cutlet unit 65. An electric igniter 67 which is a phase converter is installed between the outlet 63a and the electric field applied region 64. Here, cool air is generated by a refrigerating cycle 68 disposed at the lower portion of the apparatus 60 for supercooling, and supplied to the freezing chamber 61 through a discharge hole 68a connected to the refrigerating cycle 68. The cool air can be supplied through refrigerant tubes (not shown) formed to surround the freezing chamber 61. A discharge hole 68b and a fan 68c connected to the refrigerating cycle 68 are formed adjacent to the electric field applied region 64. The quantity of the cool air supplied to the electric field applied region 64 can be controlled by the fan 68c.

A method of operating the apparatus for supercooling in accordance with the present invention will now be explained with reference to FIG. 19.

When the valve 63b is opened, water is supplied from the external water supply sauce (not shown) to the passage 63. The water exchanges heat with the cool air of the freezing chamber 61 and is supercooled without phase transition by the electric field type energy in the energy generator or the electric field applied region 64. When the user presses the operating lever 66 by using a cup (not shown), the supercooled water is discharged through the cutlet 63a. When the supercooled water is discharged, the supercooled water is phase-transited by the operation of the phase converter or the electric igniter 67. The supercooled water contained in the cup is converted into a solid phase, thereby making slush. When the user selects the temperature of the supercooled water or the state of the slush through the panel 65a, the fan 68c is operated to control the temperature of the supercooled water. This operation is controlled by a control unit of the apparatus 60 for supercooling which operates the refrigerating cycle 68.

FIG. 17 is a structure view illustrating an apparatus for supercooling in accordance with a sixth embodiment of the present invention. The apparatus 70 for supercooling includes a water tank 171 in an electric field applied region. Except that energy is supplied to the water tank 171 by using electrodes 172, the apparatus 70 is identical to the apparatus 60 of FIG. 16. As compared with the case in that energy is applied directly to the supercooled water on the passage, supercooled water is stably generated and supplied. On the other hand, in the sixth embodiment, when a button 175b formed on a panel 175a is operated, the supercooled liquid can be supplied to a cup 175d disposed on a support 175c formed in an cutlet unit 175 through an outlet 173a without operating a phase converter 177, and the support 175c can be sufficiently separated from the cutlet 173a to make slush by potential energy of the supercooled liquid (refer to FIG. 19).

FIG. 18 is a structure view illustrating an apparatus for supercooling in accordance with a seventh embodiment of the present invention. Except that an electric field applied region 184 is formed at a refrigerating chamber door 182a, the apparatus 180 is identical to the apparatus 60 of FIG. 16. In this case, a discharge hole 182c and a fan 182d positioned adjacent to the electric field applied region 184, for supplying cool air supplied from a freezing chamber side 182 through a damper 182b to the electric field applied region 184 are formed to lower a temperature of water to a set temperature below a phase transition temperature (refer to FIG. 19). By this configuration, the present invention can be applied to a refrigerator including a dispenser in a refrigerating chamber. In this case, the electric field applied region is preferably formed in the refrigerating chamber side. If the electric field applied region is positioned in the freezing chamber side, the passage of the supercooled water is lengthened. The long passage can make it difficult to control the supercooled water and slush.

FIG. 20 is a structure view illustrating an apparatus for supercooling in accordance with an eighth embodiment of the present invention. The apparatus for supercooling includes a storing tank 101 for storing a supercooled liquid, an energy generator 201, a container 301, wings or a stirrer 401, a refrigerating cycle 500 and a control unit 600 (shown in FIG. 21).

In the storing tank 101 for storing a supercooled liquid, a liquid is stored and supercooled. In this embodiment, the storing tank 101 for storing the supercooled liquid is hollowed to store the liquid. A discharge hole 111 is formed to supply the supercooled liquid to the container 301, and a valve 121 for opening and closing the discharge hole 111 is formed on the discharge hole 111.

The energy generator 201 is positioned in the storing tank 101 for storing the supercooled liquid, for supplying energy to maintain the supercooled state of the liquid stored in the storing tank 101. In this embodiment, the energy generator 201 is composed of electrodes which can generate an electric field by current flow. The energy generator 201 includes a switch or an input unit 240 for supplying and blocking a current. The energy generator 201 includes a first electrode 211 and a second electrode 221 to generate the electric field. The first electrode 211 and the second electrode 221 are installed to face each other in the storing tank 101 for storing the supercooled liquid.

The container 301 is supplied with the supercooled liquid through the discharge hole 111 of the storing tank 101 for storing the supercooled liquid. Here, the container 301 is disposed at the lower portion of the storing tank 101 and supplied with the supercooled liquid through the discharge hole 111. In addition, the container 301 includes an insulator 321 for externally insulating the supercooled liquid from the storing tank 101. The insulator 321 covers at least a part of the container 301. In this embodiment, in order to maximally intercept external heat transmission to the supercooled liquid, the insulator 321 preferably covers the whole externally exposed surfaces of the container 301.

The wings 401 are rotated relatively to the container 301. In this embodiment, the wings 401 are installed in the container 301 and connected to a motor 421 to receive rotating force. Here, the wings 401 apply an external force to the supercooled liquid contained in the container 301, for phase-converting the supercooled liquid into slush, and continuously stirring the slush to maintain the slush state. For this, the wings 401 are formed in a screw shape, so that the supercooled liquid can flow to the front or rear portion of the wings 401. In addition, as shown in FIG. 22, the wings 401 can be formed in a rod or plate shape.

The wings 401 are rotated relatively to the container 301. Therefore, it is also possible to fix the wings 401 and rotate the container 301.

The refrigerating cycle 500 includes a compressor 520 for compressing refrigerants, a heat exchange unit 540 for exchanging heat by evaporating the compressed refrigerants, a condenser 560 for condensing the heat-exchanged refrigerants, and a fan 580 for cooling the condenser 560. The refrigerating cycle 500 supplies cool air to the storing tank 101 for storing the supercooled liquid and the container 301. The heat exchange unit 540 is installed at one side of the storing tank 101 and the container 301, for supplying the cool air to the storing tank 101 and the container 301.

FIG. 21 is a block diagram illustrating the structure of the apparatus for supercooling in accordance with the eighth embodiment of the present invention. The control unit 600 is connected to the energy generator 201, for controlling power supplied from a power supply unit 241 to the energy generator 201 according to the operation of the switch or the input unit 240, thereby controlling energy generation of the energy generator 201. Moreover, the control unit 600 is connected to the motor 421, for controlling power supplied to the motor 421, thereby controlling rotation of the wings 401. The control unit 600 can control rotation of the wings 401 to convert the supercooled liquid into the slush or to maintain the slush state. The control unit 600 is also connected to the compressor 520, for controlling power supplied to the compressor 520, thereby adjusting cooling force of refrigerants and controlling cool air supplied to the storing tank 101 for storing the supercooled liquid or the container 301.

The operation of the apparatus for supercooling in accordance with the eighth embodiment of the present invention will now be described.

After the liquid is stored in the storing tank 101 for storing the supercooled liquid, the control unit 600 cools the liquid by increasing cooling force of refrigerants by controlling the compressor 520 of the refrigerating cycle 500, and simultaneously or sequentially supercools the liquid by supplying energy to the storing tank 101 for storing the supercooled liquid through the energy generator 201 by controlling power supplied to the energy generator 201. Since the electric field generated by the first electrode 211 and the second electrode 221 is formed in the storing tank 101 for storing the supercooled liquid, the liquid is supercooled.

When the supercooled liquid is supplied from the storing tank 101 to the container 301 through the discharge hole 111 formed on the storing tank 101, the control unit 600 applies the external force to the supercooled liquid contained in the container 301 by supplying power to the motor 421. Accordingly, the supercooled liquid is phase-converted into the slush. At the same time, the wings 401 are continuously rotated to make the slush flow, thereby maintaining the slush state.

An apparatus for supercooling in accordance with a ninth embodiment of the present invention will now be explained.

FIG. 23 is a structure view illustrating the apparatus for supercooling in accordance with the ninth embodiment of the present invention, and FIG. 24 is a block diagram illustrating the structure of the apparatus for supercooling in accordance with the ninth embodiment of the present invention. Same reference numerals are used for same elements as those of the eighth embodiment of the present invention, and explanations thereof are omitted.

The apparatus for supercooling further includes a phase converter 450. The phase converter 450 applies an external force to a condenser 301 to convert a supercooled liquid into a solid phase. In this embodiment, the phase converter 450 is comprised of an electric igniter, and exposed to the inside of the container 301, for applying an electric stimulus to the supercooled liquid contained in the container 301. In addition, the phase converter 450 is connected to a control unit 600, so that the control unit 600 can control power supplied to the phase converter 450. Therefore, when the supercooled liquid is supplied from a storing tank 101 for storing the supercooled liquid to the container 301, the phase converter 450 converts the supercooled liquid into slush by applying an electric shock to the supercooled liquid. The eighth embodiment of the present invention does not include the phase converter 450, but supplies the supercooled liquid to the container 301 or converts the liquid into the slush by the wings 401.

An apparatus for supercooling in accordance with a tenth embodiment of the present invention will now be described.

FIG. 25 is a structure view illustrating the apparatus for supercooling in accordance with the tenth embodiment of the present invention. Same reference numerals are used for same elements as those of the eighth embodiment of the present invention, and explanations thereof are omitted.

A container 301 containing a liquid is supplied with cool air from a refrigerating cycle 500. The container 301 includes an insulator 321 to intercept external heat exchange. The insulator 321 covers at least a part of the container 301. In order to maximally intercept external heat exchange of the container 301, the insulator 321 preferably covers the whole externally exposed surfaces of the container 301.

The refrigerating cycle 500 is formed as described in the eighth embodiment of the present invention, for supplying cool air to the container 301.

An energy generator 201 is installed in the container 301. When the liquid contained in the container 301 is cooled by cool air from the refrigerating cycle 500, the energy generator 201 supplies energy to maintain the supercooled state. The energy generator 201 generates an electric field to form the electric field in the container 301, and includes a first electrode 211 and a second electrode 221. Here, the first electrode 211 and the second electrode 221 are installed to face each other to generate the electric field. Here, wings 401 can perform the function of the energy generator 201. In this case, the first electrode 211 and the second electrode 221 are omitted, and the wings 401 serve as the electrodes.

When the liquid is supplied to the container 301, the refrigerating cycle 500 is operated to supply cool air to the container 301, thereby cooling the liquid. The liquid is simultaneously or sequentially supercooled by forming the electric field in the container 301 by supplying power to the energy generator 210. As the wings 401 are rotated, the supercooled liquid in the container 301 is converted into slush by an external force. Since the slush is stirred by the rotated wings 401, the slush is not frozen. The wings 401 phase-convert the supercooled liquid contained in the container 301 into the slush by applying the external force to the supercooled liquid, and maintain the slush state by continuously stirring the slush. Also, if the wings 401 are slowly rotated, the state of the supercooled liquid can be maintained. A control unit 600 controls a motor 421 to differently adjust the revolution number of the wings 401 in regard to the supercooled liquid and the slush.

INDUSTRIAL APPLICABILITY

In accordance with the present invention, the apparatus for supercooling can be applied to a refrigerator, a refrigerator including a dispenser, a Kimchi refrigerator and a slush apparatus.

The invention claimed is:
1. An apparatus for supercooling, comprising:
a supercooled liquid;
a cool air supplier for supplying cool air to the supercooled liquid;
an energy generator for supplying energy, which interrupts hydrogen bonding of water consisting of oxygen and hydrogen, to the supercooled liquid to maintain the supercooled state; and
a regulator for regulating a quantity of energy supplied to the supercooled liquid by the energy generator.
2. The apparatus for supercooling of claim 1, further comprising an outlet for discharging the supercooled liquid.
3. The apparatus for supercooling of claim 2, further comprising a valve for opening and closing the outlet.
4. The apparatus for supercooling of claim 1, further comprising a panel cooperating with at least one of the cool air supplier and the energy generator, for controlling a temperature of the supercooled liquid.
5. The apparatus for supercooling of claim 1, further comprising a phase converter for converting the supercooled liquid into a solid phase.
6. The apparatus for supercooling of claim 5, further comprising an outlet for discharging slush made by converting the supercooled liquid into the solid phase.
7. The apparatus for supercooling of claim 1, further comprising a container for containing the supercooled liquid.
8. The apparatus for supercooling of claim 1, further comprising a wing rotated relatively to the container.
9. The apparatus for supercooling of claim 1, further comprising an energy generator for supplying energy to the container to make the supercooled liquid in the container.
10. The apparatus for supercooling of claim 1, further comprising a storing tank for storing the supercooled liquid to supply the supercooled liquid to the container.
11. The apparatus for supercooling of claim 1, further comprising a phase converter for phase-converting the supercooled liquid into slush.
12. An apparatus for supercooling, comprising:
a supercooled liquid; and
a phase converter for converting the supercooled liquid into a solid phase,
wherein the phase converter is an electric igniter for applying an electric shock to the supercooled liquid.
13. The apparatus for supercooling of claim 12, further comprising an electrode for supplying electric energy to the supercooled liquid to maintain the supercooled state.
14. An apparatus for supercooling, comprising:
a passage through which a supercooled liquid flows;
a phase converter for applying an external force to convert the supercooled liquid flowing through the passage into a solid phase;
a water tank disposed on the passage and containing the supercooled liquid;
an electrode for applying an electric field to the water tank; and
an electric igniter for applying an electric force to the supercooled liquid in the water tank.
15. The apparatus for supercooling of claim 14, further comprising an energy generator for supplying energy to the supercooled liquid to maintain the supercooled state.
16. The apparatus for supercooling of claim 14, further comprising a cool air supplier for supplying cool air to the supercooled liquid.
17. The apparatus for supercooling of claim 14, wherein the passage comprises an electric field applied region.
18. The apparatus for supercooling of claim 14, further comprising an electrode for applying an electric field to the water tank.
19. The apparatus for supercooling of claim 16, which is a refrigerator including a refrigerating cycle, and
wherein the cool air supplier is the refrigerating cycle of the refrigerator.
20. The apparatus for supercooling of claim 14, which is a refrigerator including a freezing chamber opened and closed by a door, and
wherein the passage comprises an outlet of the supercooled liquid, and the outlet is formed at the door of the freezing chamber.
21. The apparatus for supercooling of claim 14, which is a refrigerator including a freezing chamber which is opened and closed by a door and has an ice maker, and
wherein the door of the freezing chamber comprises an outlet region for discharging ice made in the ice maker and the supercooled liquid.
22. The apparatus for supercooling of claim 21, wherein the door of the freezing chamber comprises a button for selecting discharge of ice and a button for selecting opening of the passage.
23. The apparatus for supercooling of claim 15, which is a refrigerator including a refrigerating chamber, and
wherein the energy generator is installed in the refrigerating chamber side.
24. The apparatus for supercooling of claim 23, wherein the energy generator is installed at a door of the refrigerating chamber.
25. The apparatus for supercooling of claim 14, wherein a valve for opening and closing the passage is formed on the passage upstream of the energy generator.
26. An apparatus for supercooling, comprising:
a storing chamber for supplying cool air;
a passage formed to lower a temperature of a liquid by the cool air of the storing chamber, on which an outlet for discharging the liquid is formed;
a door on which the outlet of the passage is formed;
an energy generator positioned on the passage, for supplying energy to supercool the liquid, the energy generator including a regulator for regulating a quantity of energy to be supplied; and
a panel formed on the door, for selecting a state of the supercooled liquid.

27. The apparatus for supercooling of claim 26, wherein the energy generator comprises an electrode for forming an electric field, and the regulator regulates the intensity of the electric field.

28. The apparatus for supercooling of claim 26, further comprising a cool air regulator for regulating the cool air of the storing chamber supplied to the passage according to selection of the panel.

29. The apparatus for supercooling of claim 26, further comprising a phase converter for applying an external force to the supercooled liquid to convert the supercooled liquid into a solid phase before being discharged through the outlet.

30. The apparatus for supercooling of claim 26, further comprising a support positioned at the lower portion of the outlet at a predetermined interval to convert the supercooled liquid discharged through the outlet into a solid phase by potential energy.

31. An apparatus for supercooling, comprising:
a container for containing slush made by converting a supercooled liquid into a solid phase;
a refrigerating cycle for supplying cool air to the container; and
a wing rotated relatively to the container,
wherein the container comprises an energy generator for supplying energy, which interrupts hydrogen bonding of water consisting of oxygen and hydrogen, to maintain the supercooled liquid in the supercooled state, and the supercooled liquid is generated in the container, and
wherein the container comprises a phase converter for applying an external force to convert the supercooled liquid into a solid phase.

32. The apparatus for supercooling of claim 31, further comprising a storing tank for storing the supercooled liquid, the storing tank being positioned to supply the supercooled liquid to the container.

33. The apparatus for supercooling of claim 32, wherein the storing tank for storing the supercooled liquid comprises an energy generator for supplying energy to maintain the liquid in the supercooled state.

34. The apparatus for supercooling of claim 33, wherein the energy generator comprises a switch for intercepting energy supply.

35. The apparatus for supercooling of claim 31, wherein at least a part of the container is covered with an insulator.

36. The apparatus for supercooling of claim 31, wherein the wing is formed in a rod shape.

37. An apparatus for supercooling, comprising:
a container for containing a supercooled liquid;
a refrigerating cycle for supplying cool air to the container; and
a phase converter for applying an external force to the container to convert the supercooled liquid into a solid phase,
wherein the container comprises an energy generator for supplying energy, which interrupts hydrogen bonding of water consisting of oxygen and hydrogen, to maintain the supercooled liquid in the supercooled state, and the supercooled liquid is generated in the container.

38. The apparatus for supercooling of claim 37, further comprising a stirrer rotated relatively to the container.

39. The apparatus for supercooling of claim 37, further comprising a storing tank for storing the supercooled liquid, the storing tank being positioned to supply the supercooled liquid to the container.

* * * * *